(12) United States Patent
Klein et al.

(10) Patent No.: US 8,043,670 B2
(45) Date of Patent: Oct. 25, 2011

(54) POLYMERIZABLE MESOGENIC CYCLOHEXYL DERIVATIVES

(75) Inventors: Markus Klein, Weiterstadt (DE); Stephan Derow, Griesheim (DE)

(73) Assignee: Merck Patent GmbH, Darmstadt (DE)

( * ) Notice: Subject to any disclaimer, the term of this patent is extended or adjusted under 35 U.S.C. 154(b) by 90 days.

(21) Appl. No.: 11/200,260

(22) Filed: Aug. 10, 2005

(65) Prior Publication Data

US 2006/0049381 A1  Mar. 9, 2006

(30) Foreign Application Priority Data

Aug. 10, 2004 (EP) .................................... 04018917

(51) Int. Cl.
| | |
|---|---|
| C09K 19/20 | (2006.01) |
| C09K 19/30 | (2006.01) |
| C09K 19/38 | (2006.01) |
| G02B 5/30 | (2006.01) |
| C07C 69/76 | (2006.01) |
| C07C 25/13 | (2006.01) |
| C07C 25/24 | (2006.01) |

(52) U.S. Cl. ............... 428/1.1; 252/299.63; 252/299.67; 560/76; 570/129

(58) Field of Classification Search .................... 428/1.1, 428/1.2, 1.3, 1.31; 252/299.01, 299.63, 299.67; 526/319; 560/76; 570/129

See application file for complete search history.

(56) References Cited

U.S. PATENT DOCUMENTS

| | | | |
|---|---|---|---|
| 5,382,379 A * | 1/1995 | Onji et al. ................. | 252/299.63 |
| 6,287,650 B1 * | 9/2001 | Pauluth et al. ................. | 428/1.23 |
| 6,511,720 B2 * | 1/2003 | Pauluth et al. ................. | 428/1.23 |
| 2004/0138394 A1 * | 7/2004 | Buchecker et al. ......... | 526/303.1 |

FOREIGN PATENT DOCUMENTS

| | | | |
|---|---|---|---|
| DE | 19959721 A1 | * | 6/2000 |
| EP | 272580 | * | 6/1988 |
| EP | 1219651 | * | 7/2002 |
| JP | 06206836 | * | 7/1994 |
| JP | 8-245960 | * | 9/1996 |

OTHER PUBLICATIONS

CAPLUS 2002: 503401.*
English translation by computer for JP 08-245960, http://www4.ipdl.inpit.go.jp/Tokujitu/PAJdetail.ipdl?N0000=60&N0120=01&N2001=2&N3001=H08-245960.*
CAPLUS 1989: 67032.*
English trnaslation by automated process for DE 19959721, http://epo.worldlingo.com/wl/epo/epo.html?ACTION=description-retrieval&OPS=ops.epo.org&LOCALE=en_EP&FORMAT=docdb&COUNTRY=DE&NUMBER=19959721&KIN, Jan. 11, 2011.*
CAPLUS 2000: 442200.*
English translation by computer for DE 19959721, http://epo.worldlingo.com/wl/epo/epo.html?ACTION=description-retrieval&OPS=ops.epo.org&LOCALE=en_EP&FORMAT=docdb&COUNTRY=DE&NUMBER=19959721&KIND=A1&T=1 (1995).*
CAPLUS 1994: 335173.*
CAPLUS 1995: 234732.*
CAPLUS 1995: 252460.*

* cited by examiner

Primary Examiner — Shean Wu
(74) Attorney, Agent, or Firm — Millen, White, Zelano & Branigan, P.C.

(57) ABSTRACT

The invention relates to new polymerizable mesogenic or liquid crystalline compounds comprising a terminal cyclohexylphenyl group wherein the phenyl group has polar substituents, to polymerizable mesogenic or liquid crystalline mixtures and anisotropic polymers prepared thereof, and to the use of the new compounds and the mixtures and polymers prepared thereof in optical and electrooptical devices, adhesives, synthetic resins with anisotropic mechanical properties, cosmetics, diagnostics, liquid crystal pigments, decorative and security applications, nonlinear optics, optical information storage, electronic devices like organic field effect transistors (FET or OFET) or electroluminescent devices.

23 Claims, No Drawings

POLYMERIZABLE MESOGENIC CYCLOHEXYL DERIVATIVES

FIELD OF THE INVENTION

The invention relates to new polymerizable mesogenic or liquid crystalline compounds comprising a terminal cyclohexylphenyl group wherein the phenyl group has polar substituents, to polymerizable mesogenic or liquid crystalline mixtures and anisotropic polymers prepared thereof, and to the use of the new compounds and the mixtures and polymers prepared thereof in optical and electrooptical devices, adhesives, synthetic resins with anisotropic mechanical properties, cosmetics, diagnostics, liquid crystal pigments, decorative and security applications, nonlinear optics, optical information storage, electronic devices like organic field effect transistors (FET or OFET) or electroluminescent devices.

BACKGROUND AND PRIOR ART

Polymerizable mesogenic or liquid crystal (LC) compounds, which are also known as reactive mesogens (RM), have been described in prior art for various purposes. For example, they can be used for the preparation of linear or crosslinked LC side chain polymers. Furthermore, they can be aligned in their LC phase and subsequently polymerized in situ to give linear or crosslinked LC polymer films with uniform orientation of high quality. These films can be used as optical elements like polarisers or compensators in flat panel displays, as described for example in EP 0 397 263, WO 98/00475, WO 98/04651 or WO 98/12584.

The polymerizable mesogenic compounds described in prior art, however, often exhibit LC phases only in a small temperature range or do not show mesophase behavior at all. Another drawback for specific applications is that prior art compounds often exhibit high values of the birefringence.

In particular where polymerizable mesogenic compounds are used in optical phase retardation, compensation or alignment layers or films for LC displays (LCD), it is desirable to have available materials of which the optical properties, such as the birefringence, optical retardation and optical dispersion (wavelength dependence of the birefringence) can be adapted to those of the LC mixture in the display cell, so that optimum compensation can be achieved.

Further to the use as optical films in displays, polymerizable mesogenic compounds have been suggested for use in the active, switchable layer of an LCD.

For example, displays are known which are switched between transparent and scattering states and comprise a low molar mass liquid crystal (LC) medium and a phase-separated polymerised LC material, like for example PDLC (polymer dispersed liquid crystal) displays as described in WO 93/22397, or polymer gel or polymer network displays of the scattering type, as described in U.S. Pat. No. 5,538,768, U.S. Pat. No. 5,543,075 or EP 0 451 905.

Furthermore, displays are known wherein a low molar mass LC medium is switched between two non-scattering states, like conventional displays of e.g. the TN or STN (twisted nematic, supertwisted nematic), ECB (electrically controlled birefringence), VA (vertically aligned) or IPS (in-plane-switching) mode, and which further comprise a polymerised LC material in order to create a multidomain structure for improving the contrast at wide viewing angles or to stabilize the different switching states for reducing the driving voltage and switching times. Such displays are described for example in U.S. Pat. No. 5,189,540, U.S. Pat. No. 6,177,972, EP 0 903 392, and Hasebe et al., Jpn. J. Appl. Phys. 1994, 33, 6245. For use in the switchable layer of LCDs the polymerizable compounds are typically mixed with a low molar mass LC medium. Therefore it is required that the p F, Cl, Br, I, CN, $NO_2$ or alkyl, alkoxy, alkylcarbonyl, alkoxycarbonyl, alkylcarbonyloxy or alkoxycarbonyloxy with 1 to 20 C atoms, wherein one or more H atoms may be substituted by F or Cl Polymerizable compounds do not negatively affect the properties, like the LC phase range, birefringence and dielectric anisotropy of the LC medium. For use in switchable displays that are not of the scattering type, and where the polymerised material is not macroscopically phase separated from the low molar mass LC medium, the polymerizable compounds should further show good miscibility with the LC medium.

The polymerizable mesogenic compounds described in prior art, however, do often exhibit high melting points, show poor solubility in low molar mass LC media or tend to negatively influence the LC and electrooptical properties of LC media.

Thus, there is a demand for polymerizable mesogenic compounds with low melting points which are useful for the preparation of oriented LC polymer films as optical retarders, and for the use in the active layer of switchable LC devices, for example in mixture with low molar mass LC media where they should have optical and electrooptical properties adapted to those of the LC media and good solubility in the LC media.

Furthermore, regarding the broad range of applications for polymerizable compounds it is desirable for the expert to have available further compounds of this type that are easy to synthesize and fulfill the various requirements as described above.

It was an aim of the invention to provide new polymerizable mesogenic compounds with advantageous properties as mentioned above, thus extending the pool of polymerizable mesogenic compounds available to the expert. Other aims of the present invention are immediately evident to the person skilled in the art from the following detailed description.

The inventors of the present invention have found that these aims can be achieved by providing polymerizable mesogenic compounds as claimed in the present invention, comprising a terminal fluorinated phenyl group.

JP-A-07-069983 discloses polymerizable mesogenic compounds, including 4-(3,4-difluorophenyl)cyclohexyl acrylate and 4-(trans-4-3,4,5-trifluorophenyl)cyclohexyl) cyclohexyl acrylate, but does not specifically disclose compounds according to the present invention.

DEFINITIONS OF TERMS

The term 'liquid crystal or mesogenic material' or 'liquid crystal or mesogenic compound' means materials or compounds comprising one or more rod-shaped, board-shaped or disk-shaped mesogenic groups, i.e. groups with the ability to induce liquid crystal (LC) phase behavior. LC compounds with rod-shaped or board-shaped groups are also known in the art as 'calamitic' liquid crystals. LC compounds with a disk-shaped group are also known in the art as 'discotic' liquid crystals. The compounds or materials comprising mesogenic groups do not necessarily have to exhibit an LC phase themselves. It is also possible that they show LC phase behavior only in mixtures with other compounds, or when the mesogenic compounds or materials, or the mixtures thereof, are polymerized.

For the sake of simplicity, the term 'liquid crystal material' is used hereinafter for both mesogenic and LC materials.

Polymerizable compounds with one polymerizable group are also referred to as 'monoreactive' compounds, compounds with two polymerizable groups as 'direactive' compounds, and compounds with more than two polymerizable groups as 'multireactive' compounds. Compounds without a polymerizable group are also referred to as 'non-reactive' compounds.

The term 'reactive mesogen' (RM) means a polymerizable mesogenic or liquid crystal compound.

The term 'film' includes rigid or flexible, self-supporting or free-standing films with mechanical stability, as well as coatings or layers on a supporting substrate or between two substrates.

SUMMARY OF THE INVENTION

The invention relates to compounds of formula I $$P-Sp-(A^1-Z^1)_m-\left[\bigcirc\right]-\left[\bigcirc\right]_n-\left[\bigcirc\right]^{X^1}_{X^2}-Q \qquad I$$

wherein
P is a polymerizable group,
Sp is a spacer group,
$A^1$ are each independently an aromatic or aliphatic 5- or 6-ring, or a group comprising two or three fused aromatic or aliphatic 5- or 6 atom-rings, these rings optionally containing one or more hetero atoms selected from N, O and S, and optionally being mono- or polysubstituted,
$Z^1$ are each independently —O—, —S—, —CO—, —COO—, —OCO—, —S—CO—, —CO—S—, —O—CO—O—, —CO—NR$^0$—, —NR$^0$—CO—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —CF$_2$CH$_2$—, —CH$_2$CF$_2$—, —CF$_2$CF$_2$—, —CH=CR$^0$—, —CH=CH—, —CH=CF—, —CY$^1$=CY$^1$—, —C≡C—, —CH=CH—COO—, —OCO—CH=CH— or a single bond,
$R^0$ and $R^{00}$ are each independently H or alkyl with 1 to 12 C-atoms,
$Y^1$ and $Y^2$ are each independently H, F, Cl or CN,
Q is F, Cl, SF$_5$ or fluorinated alkyl, alkoxy, alkenyl or alkenyl-oxy with 1 to 6 C-atoms,
$X^1$ and $X^2$ are each independently H, F or Cl,
m is 0, 1 or 2, and
n is 0 or 1.

The invention further relates to a polymerizable liquid crystal material comprising at least one compound of formula I.

The invention further relates to a liquid crystal material comprising at least one compound of formula I and one or more non-polymerizable liquid crystal compounds.

The invention further relates to an anisotropic polymer or polymer film obtained from one or more compounds of formula I or from a polymerizable liquid crystal material comprising at least one compound of formula I.

The invention further relates to the use of a compound of formula I, polymerizable material or polymer prepared thereof in optical films, polarizers, compensators, beam splitters, reflective films, alignment layers, colour filters, holographic elements, hot stamping foils, coloured images, decorative or security markings, liquid crystal pigments, adhesives, synthetic resins with anisotropic mechanical properties, cosmetics, diagnostics, nonlinear optics, optical information storage, as chiral dopants, in electronic devices like for example field effect transistors (FET) as components of integrated circuitry, as thin film transistors in flat panel display applications or for Radio Frequency Identification (RFID) tags, or in semiconducting components for organic light emitting diode (OLED) applications such as electroluminescent displays or backlights of e.g. liquid crystal displays, for photovoltaic or sensor devices, as electrode materials in batteries, as photoconductors, or for electrophotographic applications like electrophotographic recording.

The invention further relates to a liquid crystal mixture or a polymer gel or network comprising one or more compounds of formula I and one or more low molar mass liquid crystal compounds.

The invention further relates to a display comprising in its active layer at least one compound of formula I or a liquid crystal mixture or polymer comprising at least one compound of formula I.

DETAILED DESCRIPTION OF THE INVENTION

The polymerizable compounds and mixtures according to the present invention have good film-forming properties, and are especially suitable for the preparation of anisotropic polymer or copolymer films with uniform orientation, optionally together with other mesogenic or non-mesogenic co-monomers. The inventive polymerizable compounds exhibit liquid crystal phases in suitable temperature ranges either themselves or when mixed with other compounds. Furthermore, polymerizable compounds and mixtures according to the present invention have reduced tendency of phase separation during polymerization. Also it is possible, by appropriate selection of the substituents on the terminal phenyl ring, to control the dielectric anisotropy of the polymerizable compounds.

in formula I is preferably selected from F, Cl, SF$_5$, CF$_3$, OCF$_3$, OCHF$_2$ or OC$_2$F$_5$, in particular F, Cl or OCF$_3$.

Very preferred are compounds of formula I wherein
Q is F,
$X^1$ is F,
$X^1$ and $X^2$ are F,
n is 1,
m is 0,
Sp, e.g., is alkylene with 1 to 20, preferably 1 to 12, C atoms which is optionally mono- or polysubstituted by F and wherein one or more non-adjacent CH$_2$ groups are optionally replaced, in each case independently from one another, by —O—, —CO—, —O—CO—, —CO—O—, —O—CO—O—, —NR$^0$—CO—O—, —O—CO—NR$^0$—, —NR$^0$—CO—NR$^0$— in such a manner that O-atoms are not directly linked to one another, wherein R$^0$ is as defined in formula I,
$Z^1$ in formula I is preferably —CO—O—, —O—CO—, —OCF$_2$—, —CF$_2$O— or a single bond.

$A^1$ in formula I is preferably selected from 1,4-cyclohexylene, 1,4-phenylene, tetrahydropyrane-2,5-diyl, dioxane-2,5-diyl, furane-2,5-diyl, thiophene-2,5-diyl, pyrrol-2,5-diyl, pyridine-2,5-diyl, pyrimidine-2,5-diyl, naphthalene-2,6-diyl, 1,2,3,4-tetrahydronaphthalene-2,6-diyl, decaline-2,6-diyl, indane-2,5-diyl, each optionally being mono- or polysubstituted by L, with L being F, Cl, Br, I, CN, NO$_2$ or alkyl, alkoxy, alkylcarbonyl, alkoxycarbonyl, alkylcarbonyloxy or alkoxycarbonyloxy with 1 to 20 C atoms, wherein one or more H atoms may be replaced by F or Cl.

L is more preferably selected from F, Cl, CN, NO$_2$, CH$_3$, C$_2$H$_5$, OCH$_3$, OC$_2$H$_5$, COCH$_3$, COC$_2$H$_5$, COOCH$_3$, COOC$_2$H$_5$, CF$_3$, OCF$_3$, OCHF$_2$ or OC$_2$F$_5$, in particular F, Cl, CN, CH$_3$, C$_2$H$_5$, OCH$_3$, COCH$_3$ or OCF$_3$, most preferably F, Cl, CH$_3$, OCH$_3$ or COCH$_3$.

Preferably -(A$^1$-Z$^1$)$_m$— is selected from the groups listed below or their mirror images. Therein, Phe is 1,4-phenylene, PheL is 1,4-phenylene that is substituted by 1 to 4 groups L as defined above, Cyc is 1,4-cyclohexylene and Z has one of the meanings of Z$^1$ in formula I.

| | |
|---|---|
| -Phe-Z— | II-1 |
| -Cyc-Z— | II-2 |
| -PheL-Z— | II-3 |
| -Cyc-Z-Cyc-Z— | II-4 |
| -Phe-Z-Cyc-Z— | II-5 |
| -PheL-Z-Cyc-Z— | II-6 |
| -Phe-Z-Phe-Z— | II-7 |
| -PheL-Z-Phe-Z— | II-8 |
| -PheL-Z-PheL-Z- | II-9 |

Z is preferably —COO—, —OCO—, —OCF$_2$— or a single bond.

Especially preferred are groups of formula II-1, wherein Z is —COO—.

PheL in these preferred formulae is preferably denoting

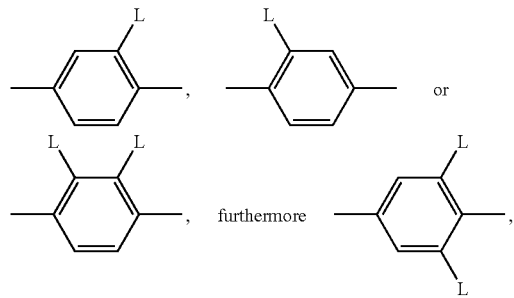

with L having each independently one of the meanings given above.

The polymerizable group P is a group that is capable of participating in a polymerization reaction, such as radicalic or ionic chain polymerization, polyaddition or polycondensation, or capable of being grafted, for example by condensation or addition, to a polymer backbone in a polymeranalogous reaction. Such groups are well known in the art. Especially preferred are polymerizable groups for chain polymerization reactions, such as radicalic, cationic or anionic polymerization. Very preferred are polymerizable groups comprising a C—C double or triple bond, and polymerizable groups capable of polymerization by a ring-opening reaction, like oxetanes or epoxides.

Very preferably the polymerizable group is selected from CH$_2$=CW$^1$—COO—,

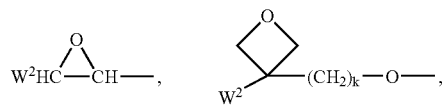

CH$_2$=CW$^2$—(O)$_{k1}$—, CH$_3$—CH=CH—O—, (CH$_2$=CH)$_2$CH—OCO—, (CH$_2$=CH—CH$_2$)$_2$CH—OCO—, (CH$_2$=CH)$_2$CH—O—, (CH$_2$=CH—CH$_2$)$_2$N—, (CH$_2$=CH—CH$_2$)$_2$N—CO—, HO—CW$^2$W$^3$—, HS—CW$^2$W$^3$—, HW$^2$N—, HO—CW$^2$W$^3$—NH—, CH$_2$=CW$^1$—CO—NH—, CH$_2$=CH—(COO)$_{k1}$-Phe-(O)$_{k2}$—, Phe-CH=CH—, HOOC—, OCN— and W$^4$W$^5$W$^6$Si—, with W$^1$ being H, Cl, CN, phenyl or alkyl with 1 to 5 C-atoms, in particular H, Cl or CH$_3$, W$^2$ and W$^3$ being independently of each other H or alkyl with 1 to 5 C-atoms, in particular methyl, ethyl or n-propyl, W$^4$, W$^5$ and W$^6$ being independently of each other Cl, oxaalkyl or oxacarbonylalkyl with 1 to 5 C-atoms, Phe being 1,4-phenylene that is optionally substituted by one or more groups L as defined above, and k$_1$ and k$_2$ being independently of each other 0 or 1.

Especially preferred groups P are CH$_2$=CH—COO—, CH$_2$=C(CH$_3$)—COO—, CH$_2$=CH—, CH$_2$=CH—O—, (CH$_2$=CH)$_2$CH—OCO—, (CH$_2$=CH)$_2$CH—O—, and

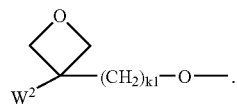

Very preferred are acrylate and oxetane groups. Oxetanes produce less shrinkage upon polymerization (cross-linking), which results in less stress development within films, leading to higher retention of ordering and fewer defects. Oxetane cross-linking also requires a cationic initiator, which unlike free radical initiator is inert to oxygen.

As for the spacer group Sp all groups can be used that are known for this purpose to the skilled in the art. The spacer group Sp is preferably of formula Sp'-X, such that P-Sp- is P-Sp'-X—, wherein Sp' is alkylene with 1 to 20 C atoms, preferably 1 to 12 C-atoms, which is optionally mono- or polysubstituted by F, Cl, Br, I or CN, and wherein one or more non-adjacent CH$_2$ groups are optionally replaced, in each case independently from one another, by —O—, —S—, —NH—, —NR$^0$—, —SiR$^0$R$^{00}$—, —CO—, —COO—, —OCO—, —OCO—O—, —S—CO—, —CO—S—, —NR$^0$—CO—O—, —O—CO—NR$^0$—, —NR$^0$—CO—NR$^0$—, —CH=CH— or —C≡C— in such a manner that O and/or S atoms are not linked directly to one another, X is —O—, —S—, —CO—, —COO—, —OCO—, —O—COO—, —CO—NR$^0$—, —NR$^0$—CO—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR$^0$—, —CY$^1$=CY$^2$—, —C≡C—, —CH=CH—COO—, —OCO—CH=CH— or a single bond, R$^0$ and R$^{00}$ are independently of each other H or alkyl with 1 to 12 C-atoms, and Y$^1$ and Y$^2$ are independently of each other H, F, Cl or CN.

X is preferably —O—, —S—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —CF$_2$CH$_2$—, —CH$_2$CF$_2$—, —CF$_2$CF$_2$—,
—CH=N—, —N=CH—, —N=N—, —CH=CR$^0$—, —CY$^1$=CY$^2$—, —C≡C— or a single bond, in particular —O—, —S—, —C≡C—, —CY$^1$=CY$^2$— or a single bond, very preferably a group that is able to from a conjugated system, such as —C≡C— or —CY$^1$=CY$^2$—, or a single bond.

Typical groups Sp' are, for example, —(CH$_2$)$_p$—, —(CH$_2$CH$_2$O)$_q$—CH$_2$CH$_2$—, —CH$_2$CH$_2$—S—CH$_2$CH$_2$— or —CH$_2$CH$_2$—NH—CH$_2$CH$_2$— or —(SiR$^0$R$^{00}$—O)$_p$—, with p being an integer from 2 to 12, q being an integer from 1 to 3 and R$^0$ and R$^{00}$ having the meanings given above.

Preferred groups Sp' are ethylene, propylene, butylene, pentylene, hexylene, heptylene, octylene, nonylene, decylene, undecylene, dodecylene, octadecylene, ethyleneoxyethylene, methyleneoxybutylene, ethylene-thioethylene, ethylene-N-methyl-iminoethylene, 1-methylalkylene, ethenylene, propenylene and butenylene for example.

In another preferred embodiment the group Sp' is a chiral group of formula III:

$$-Q^1-\overset{*}{\underset{Q^3}{CH}}-Q^4-$$ III wherein
Q$^1$ is an alkylene or alkylene-oxy group with 1 to 9 C atoms or a single bond,
Q$^3$ is an alkyl or alkoxy group with 1 to 10 C atoms which may be unsubstituted, mono- or polysubstituted by F, Cl, Br or CN, it being also possible for one or more non-adjacent CH$_2$ groups to be replaced, in each case independently from one another, by
—C≡C—, —O—, —S—, —NH—, —N(CH$_3$)—, —CO—, —COO—, —OCO—, —OCO—O—, —S—CO— or —CO—S— in such a manner that oxygen atoms are not linked directly to one another,
Q$^4$ is an alkylene or alkylene-oxy group with 1 to 10 C atoms or a single bond, being different from Q$^1$,
with Q$^1$ being linked to the polymerizable group P.

Particularly preferred compounds of formula I are those of the following formulae

I1

I2

I3

-continued

I4

I5 wherein P and Sp have the meanings of formula I.

Further preferred are compounds of the following formulae

Ia

Ib

Ic

Id

Ie

If wherein P, $X^1$, $X^2$ and Q are as defined in formula I, Sp' has one of the meaning of Sp' given above and $Sp^2$ is alkylene with 1 to 12 C-atoms.

The compounds of formula I can be synthesized according to or in analogy to methods which are known per se and which are described in standard works of organic chemistry such as, for example, Houben-Weyl, Methoden der organischen Chemie, Thieme-Verlag, Stuttgart. Suitable methods of preparation for compounds like those of formula Ia and Ib, for example, are described below in Scheme 1 and Scheme 2, respectively. Further methods can be taken from the examples.

Scheme 1:

Step 1:

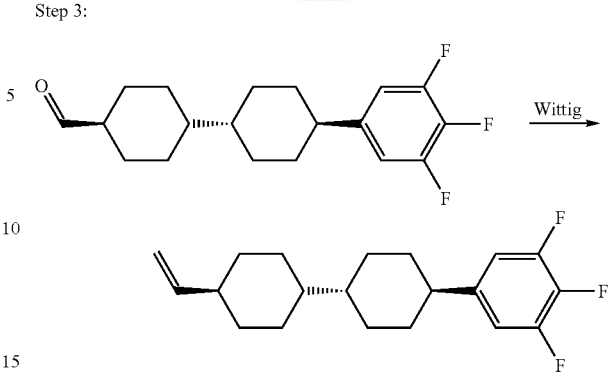

Step 2:

Step 3:

Step 4:

Step 5:

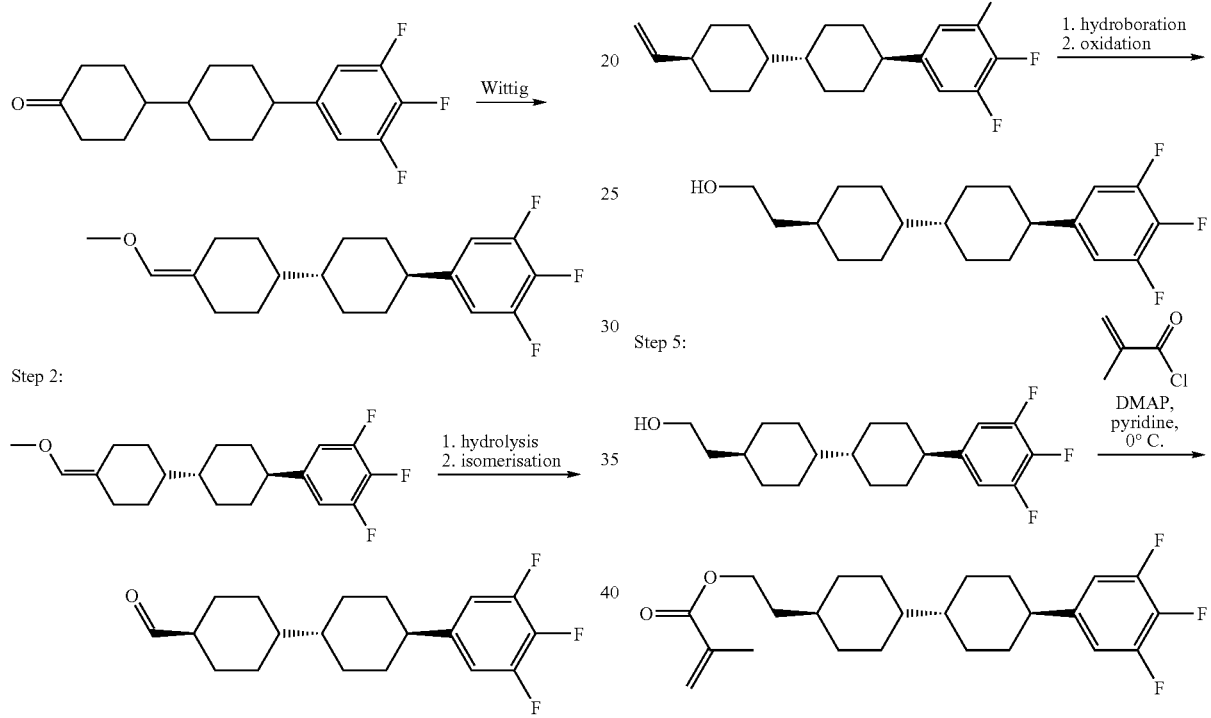

Scheme 2:

Step 1:

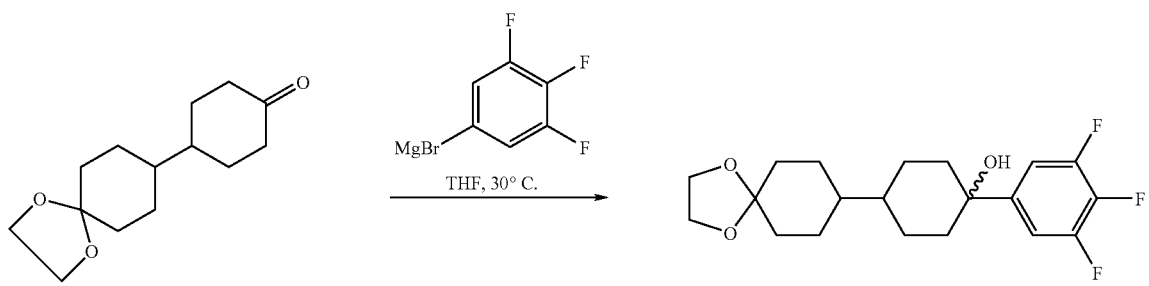

-continued
Step 2:
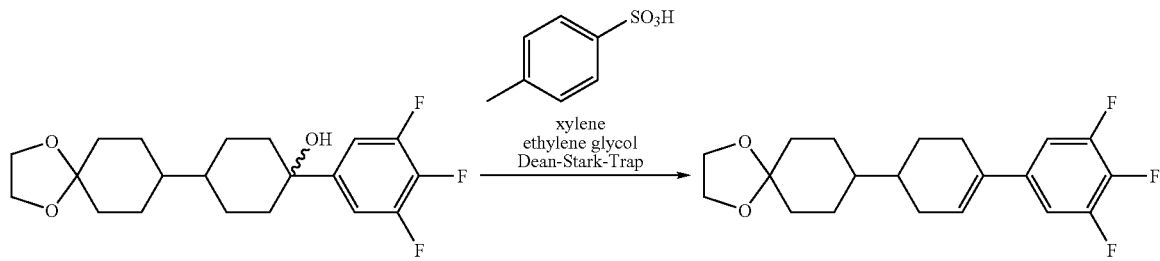
Step 3:
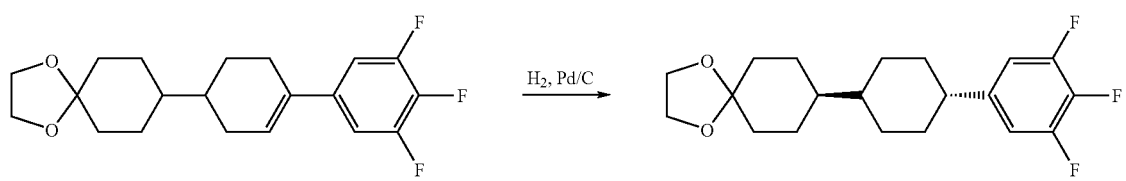
Step 4:
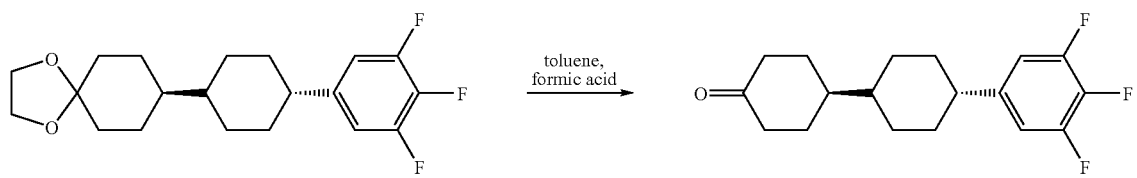
Step 5:
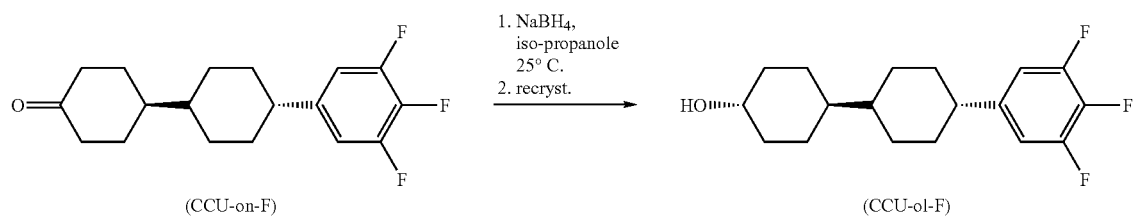
(CCU-on-F)   (CCU-ol-F)
Step 6:
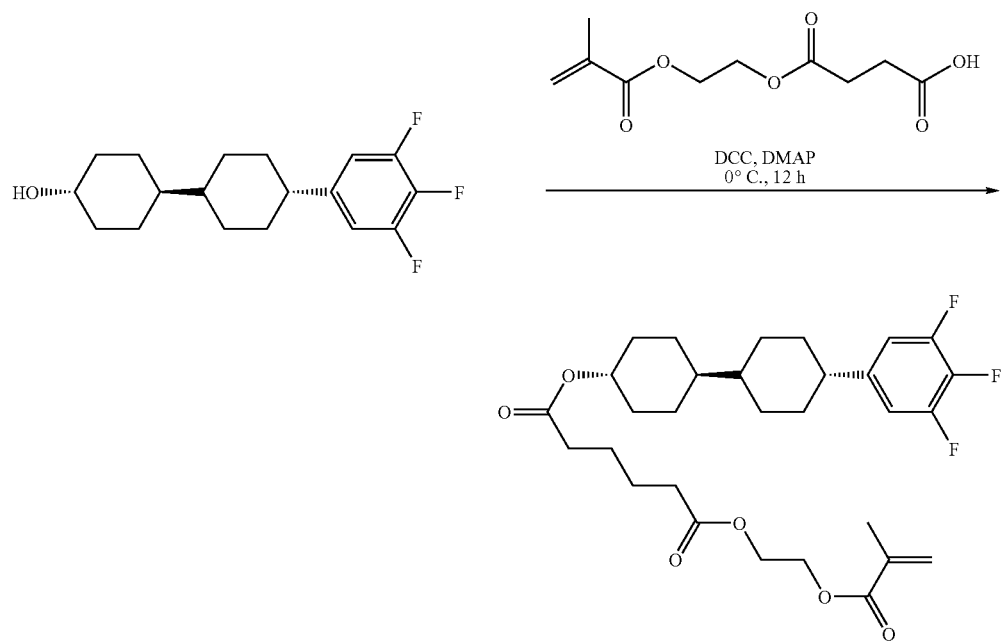

The compounds of formula I and polymerizable liquid crystal mixtures comprising them are useful for the preparation of anisotropic polymer films or coatings.

For the preparation of anisotropic polymer films, the liquid crystal mixture according to the present invention should comprise at least one polymerizable compound, which can be a compound of formula I or an additional polymerizable mesogenic or liquid crystalline compound.

In a preferred embodiment of the present invention the polymerizable material comprises at least one di- or multireactive achiral polymerizable mesogenic compound and at least one monoreactive achiral polymerizable mesogenic compound.

In another preferred embodiment of the present invention the polymerizable material comprises at least two monoreactive achiral polymerizable mesogenic compounds.

In a preferred embodiment of the present invention the polymerizable material comprises at least one di- or multireactive chiral polymerizable mesogenic compound and at least one mono-, di- or multireactive achiral polymerizable mesogenic compound.

In another preferred embodiment of the present invention the polymerizable material comprises at least one monoreactive chiral polymerizable mesogenic compound and at least one mono-, di- or multireactive achiral polymerizable mesogenic compound.

In another preferred embodiment the polymerizable material comprises at least one non-reactive chiral compound and at least one mono-, di- or multireactive polymerizable mesogenic compound.

If di- or multireactive compounds are present in the polymerizable material, a three-dimensional polymer network is formed. An optical retardation film made of such a network is self-supporting and shows a high mechanical and thermal stability and a low temperature dependence of its physical and optical properties.

By varying the concentration of the di- and multireactive compounds the crosslink density of the polymer film and thereby its physical and chemical properties such as the glass transition temperature, which is also important for the temperature dependence of the optical properties of the optical retardation film, the thermal and mechanical stability or the solvent resistance can be tuned easily.

A preferred polymerizable LC mixture comprises
5 to 100% of one or more compounds of formula I,
0-80%, preferably 5 to 50% of one or more direactive achiral mesogenic compounds,
5-80%, preferably 5 to 70% of one or more monoreactive achiral mesogenic compounds,
0-80%, preferably 5 to 50% of one or more mono- or direactive chiral mesogenic compounds and/or 0-20% of one or more non-reactive chiral compounds which may also be mesogenic,
0 to 15%, preferably 0.1 to 10%, very preferably 0.5 to 5% of one or more photoinitiators,
0 to 10% of one or more chain transfer agents,
0 to 3% of one or more non-reactive, monoreactive, di- or multireactive surfactants.

Polymerizable mesogenic mono-, di- and multireactive compounds used for the present invention can be prepared by methods which are known per se and which are described, for example, in standard works of organic chemistry such as, for example, Houben-Weyl, Methoden der organischen Chemie, Thieme-Verlag, Stuttgart.

Examples of suitable polymerizable mesogenic compounds that can be used as monomers or comonomers in a polymerizable LC mixture according to the present invention are disclosed for example in WO 93/22397, EP 0 261 712, DE 195 04 224, WO 95/22586, WO 97/00600 and GB 2 351 734. The compounds disclosed in these documents, however, are to be regarded merely as examples that shall not limit the scope of this invention.

Examples of especially useful chiral and achiral polymerizable mesogenic compounds (reactive mesogens) are shown in the following lists which should, however, be taken only as illustrative and is in no way intended to restrict, but instead to explain the present invention:

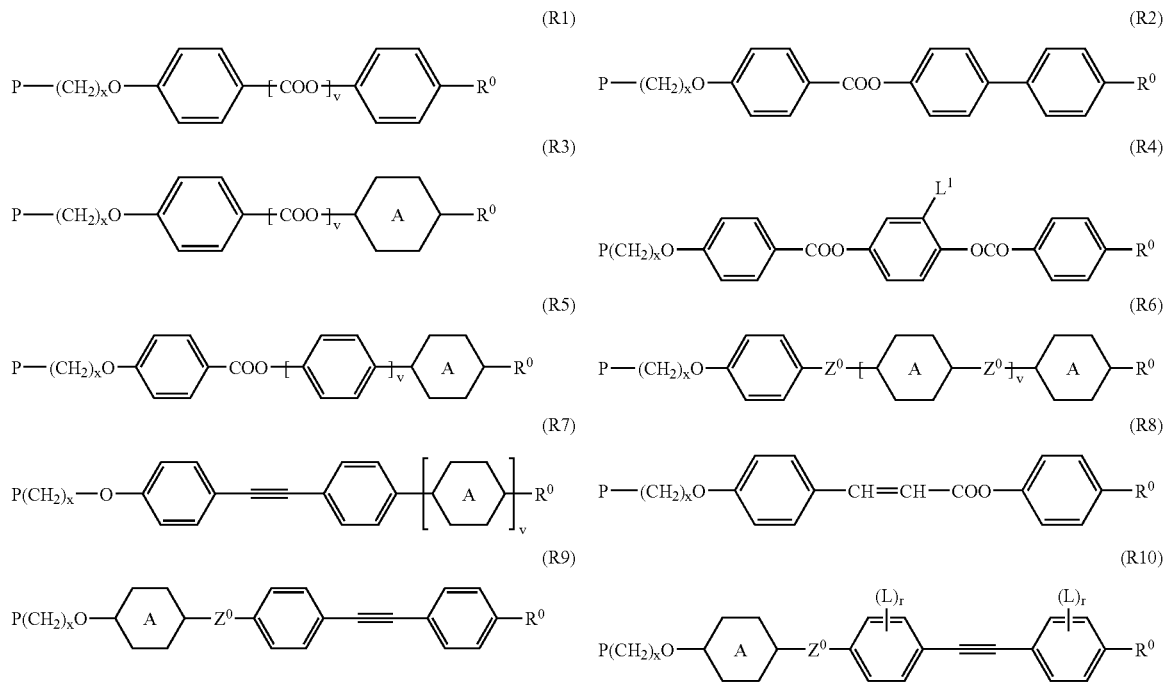

-continued
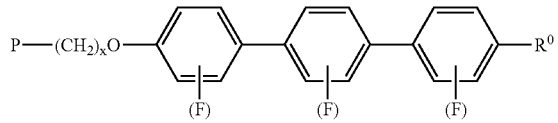 (R11)
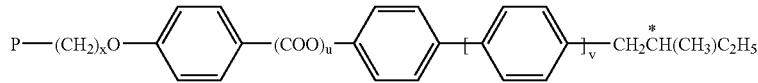 (R12)
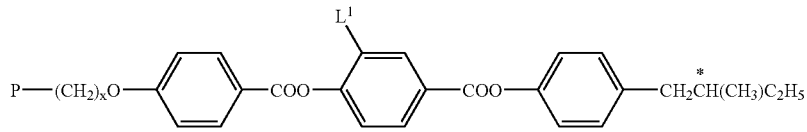 (R13)
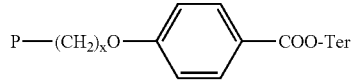 (R14)
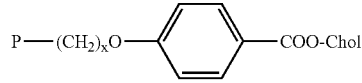 (R15)
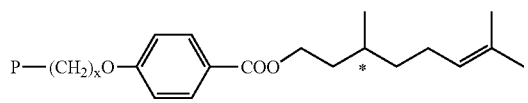 (R16)
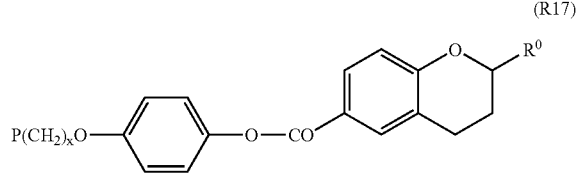 (R17)
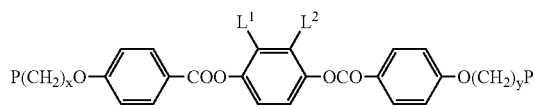 (R18)
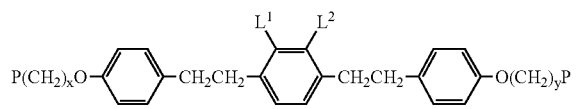 (R19)
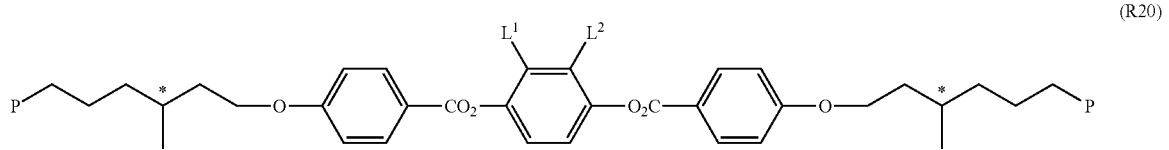 (R20)
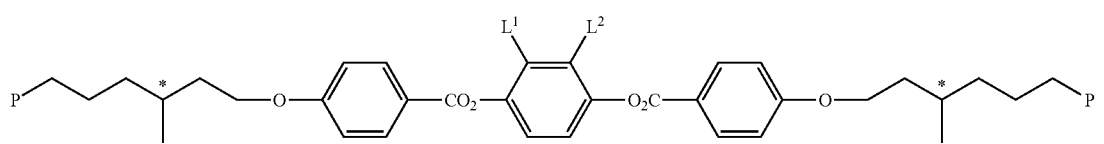 (R21)
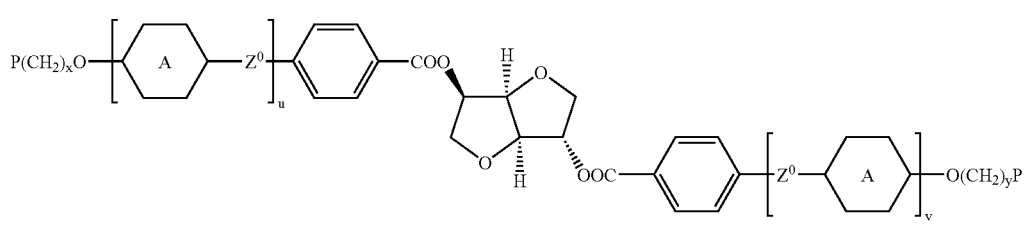 (R22)

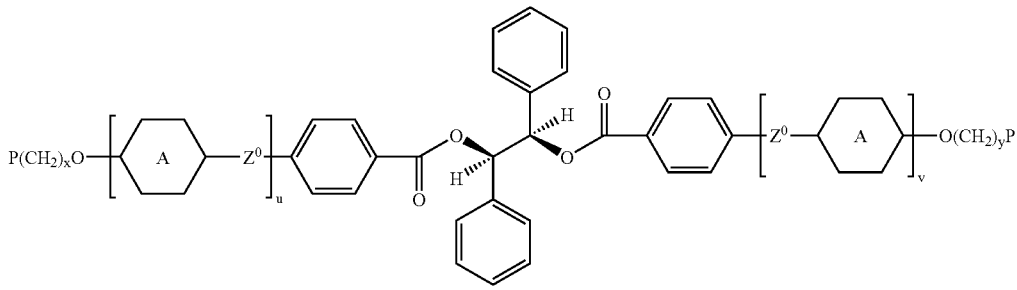

(R23)

In the above formula, P is a polymerizable group, preferably an acryl, methacryl, vinyl, vinyloxy, propenyl ether, epoxy, oxetane or styryl group, x and y are identical or different integers from 1 to 12, A is 1,4-phenylene that is optionally mono-, di- or trisubstituted by $L^1$, or 1,4-cyclohexylene, u and v are independently of each other 0 or 1, $Z^0$ is —COO—, —OCO—, —CH$_2$CH$_2$—, —CH=CH—, —C≡C— or a single bond, $R^0$ is a polar group or an unpolar group, Ter is a terpenoid radical like e.g. menthyl, Chol is a cholesteryl group, L, $L^1$ and $L^2$ are independently of each other H, F, Cl, CN or an optionally halogenated alkyl, alkoxy, alkylcarbonyl, alkylcarbonyloxy, alkoxycarbonyl or alkoxycarbonyloxy group with 1 to 7 C atoms, and r is 0, 1, 2, 3 or 4. The phenyl rings in the above formulae are optionally substituted by 1, 2, 3 or 4 groups L.

The term 'polar group' in this connection means a group selected from F, Cl, CN, NO$_2$, OH, OCH$_3$, OCN, SCN, an optionally fluorinated alkycarbonyl, alkoxycarbonyl, alkylcarbonyloxy or alkoxycarbonyloxy group with up to 4 C atoms or a mono-, oligo- or polyfluorinated alkyl or alkoxy group with 1 to 4 C atoms. The term 'unpolar group' means an optionally halogenated alkyl, alkoxy, alkycarbonyl, alkoxycarbonyl, alkylcarbonyloxy or alkoxycarbonyloxy group with 1 or more, preferably 1 to 12 C atoms which is not covered by the above definition of 'polar group'.

Suitable chiral dopants can be selected e.g. from the commercially available R- or S-811, R- or S-1011, R- or S-2011, R- or S-3011, R- or S-4011, R- or S-5011, or CB 15 (from Merck KGaA, Darmstadt, Germany). Very preferred are chiral compounds with a high helical twisting power (HTP), in particular compounds comprising a sorbitol group as described in WO 98/00428, compounds comprising a hydrobenzoin group as described in GB 2,328,207, chiral binaphthyl derivatives as described in WO 02/94805, chiral binaphthol acetal derivatives as described in WO 02/34739, chiral TADDOL derivatives as described in WO 02/06265, and chiral compounds having at least one fluorinated linkage group and a terminal or central chiral group as described in WO 02/06196 and WO 02/06195.

For preparation of a polymer film, the polymerizable LC material is preferably coated onto substrate, aligned into a uniform orientation and polymerised to permanently fix the cholesteric structure. As a substrate for example a glass or quarz sheet or a plastic film or sheet can be used. It is also possible to put a second substrate on top of the coated mixture prior to and/or during and/or after polymerization. The substrates can be removed after polymerization or not. When using two substrates in case of curing by actinic radiation, at least one substrate has to be transmissive for the actinic radiation used for the polymerization. Isotropic or birefringent substrates can be used. In case the substrate is not removed from the polymerized film after polymerization, preferably isotropic substrates are used.

Preferably at least one substrate is a plastic substrate such as for example a film of polyester such as polyethyleneterephthalate (PET) or polyethylenenaphthalate (PEN), of polyvinylalcohol (PVA), polycarbonate (PC) or triacetylcellulose (TAC), especially preferably a PET film or a TAC film. As a birefringent substrate for example an uniaxially stretched plastic film can be used. For example PET films are commercially available from DuPont Teijin Films under the trade name Melinex®.

The polymerizable material can also be dissolved in a solvent, preferably in an organic solvent. The solution is then coated onto the substrate, for example by spin-coating or other known techniques, and the solvent is evaporated off before polymerization. In most cases it is suitable to heat the mixture in order to facilitate the evaporation of the solvent.

Polymerization of the LC material is preferably achieved by exposing it to heat or actinic radiation. Actinic radiation means irradiation with light, like UV light, IR light or visible light, irradiation with X-rays or gamma rays or irradiation with high energy particles, such as ions or electrons. Preferably polymerization is carried out by photoirradiation, in particular with UV light. As a source for actinic radiation for example a single UV lamp or a set of UV lamps can be used. When using a high lamp power the curing time can be reduced. Another possible source for photoradiation is a laser, like e.g. a UV laser, an IR laser or a visible laser.

Polymerization is preferably carried out in the presence of an initiator absorbing at the wavelength of the actinic radiation. For example, when polymerising by means of UV light, a photoinitiator can be used that decomposes under UV irradiation to produce free radicals or ions that start the polymerization reaction. UV photoinitiators are preferred, in particular radicalic UV photoinitiators.

Preferably the polymerizable mixture comprises one or more conventional or liquid crystal photoinitiators. As standard photoinitiator for radical polymerization for example the commercially available Irgacure® 651, Irgacure® 184, Darocure® 1173 or Darocure® 4205 (all from Ciba Geigy AG) can be used, whereas in case of cationic photopolymerization the commercially available UVI 6974 (Union Carbide) can be used. As LC photoinitiator for example one of the compounds disclosed in EP 03014990.0 or the following compound can be used:

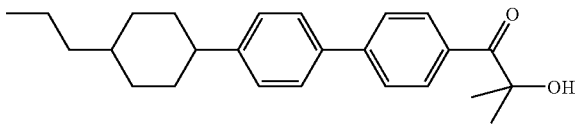

The curing time is dependent, inter alia, on the reactivity of the polymerizable material, the thickness of the coated layer, the type of polymerization initiator and the power of the UV lamp. The curing time according to the invention is preferably not longer than 10 minutes, particularly preferably not longer than 5 minutes and very particularly preferably shorter than 2 minutes. For mass production short curing times of 3 minutes or less, very preferably of 1 minute or less, in particular of 30 seconds or less, are preferred.

The polymerizable LC material can additionally comprise one or more other suitable components such as, for example, catalysts, sensitizers, stabilizers, chain-transfer agents, inhibitors, accelerators, co-reacting monomers, surface-active compounds, lubricating agents, wetting agents, dispersing agents, hydrophobing agents, adhesive agents, flow improvers, defoaming agents, deaerators, diluents, reactive diluents, auxiliaries, colourants, dyes or pigments.

The mixture may also comprise one or more dyes having an absorption maximum adjusted to the wavelength of the radiation used for polymerization, in particular UV dyes like e.g. 4,4'-azoxy anisole or the commercially available Tinuvin (from Ciba AG, Basel, Switzerland).

In another preferred embodiment the mixture of polymerizable material comprises up to 70%, preferably 1 to 50% of one or more non-mesogenic compounds with one polymerizable functional group. Typical examples are alkylacrylates or alkylmethacrylates.

It is also possible, in order to increase crosslinking of the polymers, to add up to 20% of one or more non-mesogenic compounds with two or more polymerizable functional groups to the polymerizable LC material alternatively or in addition to the di- or multireactive polymerizable mesogenic compounds to increase crosslinking of the polymer. Typical examples for direactive non-mesogenic monomers are alkyldiacrylates or alkyldimethacrylates with alkyl groups of 1 to 20 C atoms. Typical examples for multireactive non-mesogenic monomers are trimethylpropanetrimethacrylate or pentaerythritoltetraacrylate.

It is also possible to add one or more chain transfer agents to the polymerizable material in order to modify the physical properties of the inventive polymer film. Especially preferred are thiol compounds, such as monofunctional thiol compounds like e.g. dodecane thiol or multifunctional thiol compounds like e.g. trimethylpropane tri(3-mercaptopropionate), very preferably mesogenic or liquid crystalline thiol compounds as for example disclosed in WO 96/12209, WO 96/25470 or U.S. Pat. No. 6,420,001. When adding a chain transfer agent, the length of the free polymer chains and/or the length of the polymer chains between two crosslinks in the inventive polymer film can be controlled. When the amount of the chain transfer agent is increased, the polymer chain length in the obtained polymer film is decreasing.

When preparing a polymer film, it is usually necessary to achieve uniform alignment of the polymerizable material. For example, some uses require planar alignment, i.e. wherein in case of an achiral material the LC director is oriented parallel to the film plane, or in case of a cholesteric material the cholesteric helix axis is oriented substantially perpendicular to the film plane. Planar alignment can be achieved for example by shearing the material, e.g. by means of a doctor blade. It is also possible to apply an alignment layer, for example a layer of rubbed polyimide or sputtered $SiO_x$, on top of at least one of the substrates. Planar alignment can also be achieved by rubbing the substrate without applying an additional alignment layer, e.g. by means of a rubbing cloth or a rubbing roller. Planar alignment with a low tilt angle can also be achieved by adding one or more surfactants to the polymerizable mesogenic material. Suitable surfactants are described for example in J. Cognard, Mol. Cryst. Liq. Cryst. 78, Supplement 1, 1-77 (1981). Particularly preferred are non-ionic surfactants, e.g. non-ionic fluorocarbon surfactants, like the commercially available Fluorad® (from 3M), or Zonyl FSN® (from DuPont), or polymerizable surfactants as disclosed in EP 1 256 617 A1. Further preferred are multi-block surfactants as disclosed in GB 2 383 040 A.

In some cases it is of advantage to apply a second substrate to aid alignment and exclude oxygen that may inhibit the polymerization. Alternatively the curing can be carried out under an atmosphere of inert gas. However, curing in air is also possible using suitable photoinitiators and high UV lamp power. When using a cationic photoinitiator oxygen exclusion most often is not needed, but water should be excluded. In a preferred embodiment of the invention the polymerization of the polymerizable material is carried out under an atmosphere of inert gas, preferably under a nitrogen atmosphere.

Furthermore, the compounds of formula I are suitable as comonomers for liquid crystal materials with semiconductor or charge carrier properties, which can be used in electronic devices like for example field effect transistors (FET) as components of integrated circuitry, as thin film transistors in flat panel display applications or for Radio Frequency Identification (RFID) tags, or semiconducting components for organic light emitting diode (OLED) applications such as electroluminescent displays or backlights of e.g. liquid crystal displays, photovoltaic or sensor devices, photoconductors, or electrophotographic applications like electrophotographic recording devices.

For example, semiconductors comprising polymerizable liquid crystal compounds are disclosed in WO 00/79617, JP-A-2000-347432, JP-A-11-209761, Sirringhaus et al., Appl. Phys. Lett., 77(3) (2000) 406-408, and Grell et al., J. Korean Phys. Soc. 2000, 36(6), 331. Electroluminescent devices using liquid crystal materials are described for example in WO 95/17018 and WO 95/04306. Organic photoconductors with liquid crystal properties are described for example in EP 0 563 768 and EP 0 527 376.

The invention also relates to a liquid crystal mixture, in particular a nematic liquid crystal mixture, comprising at least one compound of formula I and one or more non-polymerizable liquid crystal compounds.

The invention also relates to a liquid crystal display comprising a liquid crystal medium or mixture containing at least one compound of formula I.

For the applications described above the liquid crystal mixture preferably contains at least one compound of formula I, and a nematic host mixture comprising one or more nematic or nematogenic compounds.

Preferably the liquid crystal mixture consists of 2 to 25, preferably 3 to 15 compounds, at least one of which is a compound of formula I. The other compounds, forming the nematic host mixture, are preferably low molecular weight liquid crystal compounds selected from nematic or nematogenic substances, for example from the known classes of the azoxybenzenes, benzylidene-anilines, biphenyls, terphenyls, phenyl or cyclohexyl benzoates, phenyl or cyclohexyl esters of cyclohexanecarboxylic acid, phenyl or cyclohexyl esters of cyclohexylbenzoic acid, phenyl or cyclohexyl esters of cyclohexylcyclohexanecarboxylic acid, cyclohexylphenyl esters of benzoic acid, of cyclohexanecarboxylic acid and of cyclohexylcyclohexanecarboxylic acid, phenylcyclohexanes, cyclohexyl-biphenyls, phenylcyclohexylcyclohexanes, cyclohexylcyclohexanes, cyclohexylcyclohexenes, cyclohexylcyclohexylcyclohexenes, 1,4-bis-cyclohexylbenzenes, 4,4'-bis-cyclohexylbiphenyls, phenyl- or cyclo-hexylpyrimidines, phenyl- or cyclohexylpyridines, phenyl- or cyclohexylpyridazines, phenyl- or cyclohexyldioxanes, phenyl- or cyclo-hexyl-1,3-dithianes, 1,2-diphenyl-ethanes, 1,2-dicyclohexylethanes, 1-phenyl-2-cyclohexylethanes, 1-cyclohexyl-2-(4-phenylcyclohexylyethanes, 1-cyclohexyl-2-biphenyl-ethanes, 1-phenyl-2-cyclohexyl-phenylethanes, optionally halogenated stilbenes, benzyl phenyl ether, tolanes, substituted cinnamic acids and further classes of nematic or nematogenic substances. The 1,4-phenylene groups in these compounds may also be laterally mono- or difluorinated.

The liquid crystal mixture of this preferred embodiment is based on the achiral compounds of this type.

The most important compounds that are possible as components of these liquid crystal mixtures can be characterized by the following formula

R'-L'-G'-E-R"

wherein L' and E, which may be identical or different, are in each case, independently from one another, a bivalent radical from the group formed by -Phe-, -Cyc-, -Phe-Phe-, -Phe-Cyc-, -Cyc-Cyc-, -Pyr-, -Dio-, —B-Phe- and —B-Cyc- and their mirror images, where Phe is unsubstituted or fluorine-substituted 1,4-phenylene, Cyc is trans-1,4-cyclohexylene or 1,4-cyclohexenylene, Pyr is pyrimidine-2,5-diyl or pyridine-2,5-diyl, Dio is 1,3-dioxane-2,5-diyl and B is 2-(trans-1,4-cyclohexyl)ethyl, pyrimidine-2,5-diyl, pyridine-2,5-diyl or 1,3-dioxane-2,5-diyl.

G' in these compounds is selected from the following bivalent groups —CH=CH—, —N(O)N—, —CH=CY—, —CH=N(O)—, —C≡C—, —CH$_2$—CH$_2$—, —CO—O—, —CH$_2$—O—, —CO—S—, —CH$_2$—S—, —CH=N—, —COO-Phe-COO— or a single bond, with Y being halogen, preferably chlorine, or —CN.

R' and R" are, in each case, independently of one another, alkyl, alkenyl, alkoxy, alkenyloxy, alkanoyloxy, alkoxycarbonyl or alkoxycarbonyloxy with 1 to 18, preferably 3 to 12 C atoms, or alternatively one of R' and R" is F, CF$_3$, OCF$_3$, Cl, NCS or CN.

In most of these compounds R' and R" are, in each case, independently of each other, alkyl, alkenyl or alkoxy with different chain length, wherein the sum of C atoms in nematic media generally is between 2 and 9, preferably between 2 and 7.

Many of these compounds or mixtures thereof are commercially available. All of these compounds are either known or can be prepared by methods which are known per se, as described in the literature (for example in the standard works such as Houben-Weyl, Methoden der Organischen Chemie [Methods of Organic Chemistry], Georg-Thieme-Verlag, Stuttgart), to be precise under reaction conditions which are known and suitable for said reactions. Use may also be made here of variants which are known per se, but are not mentioned here.

The compounds of formula I can be used in a liquid crystal mixture for displays like, for example, TN or STN displays, active matrix displays, displays of the IPS (in plane switching) or VA (vertically aligned) mode like VAN (vertically aligned nematic) or VAC (vertically aligned cholesteric), displays of the ECB (electrically controlled birefringence), DAP (deformation of aligned phases), CSH (colour super homeotropic) or ASM (axially symmetric microcell) mode, phase-change, guest-host, flexoelectric, ferroelectric displays, bistable nematic and cholesteric displays like PSCT (polymer stabilized cholesteric texture), or PDLC, polymer gel or polymer network displays.

In the foregoing and in the following examples the following abbreviations are used to illustrate the liquid crystalline phase behavior of the compounds: G=glass transition; K=crystalline; N=nematic; S=smectic; Ch=cholesteric; I=isotropic. The numbers between the symbols indicate the phase transition temperatures in ° C. Furthermore, mp. is the melting point, Δn is the optical anisotropy measured at 20° C. and 589 nm, Δ∈ is the dielectric anisotropy at 20° C. and 1 kHz, DCC is N,N'-dicyclohexylcarbo-diimide, DMAP is 4-dimethylaminopyridine.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and, all parts and percentages are by weight, unless otherwise indicated.

Example 1

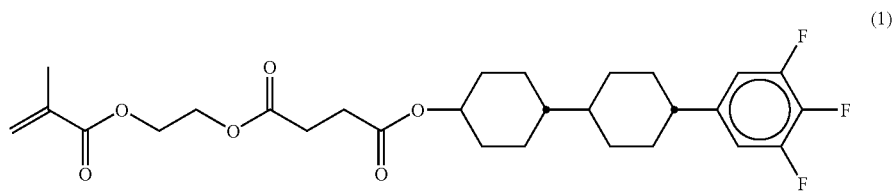

Compound (1)

is prepared as follows:
Step 1:

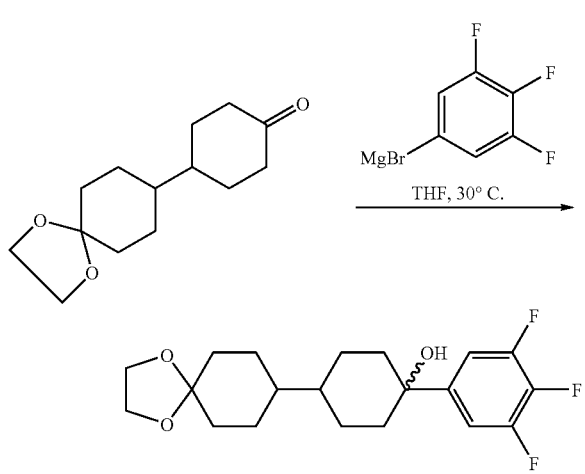

Step 2:

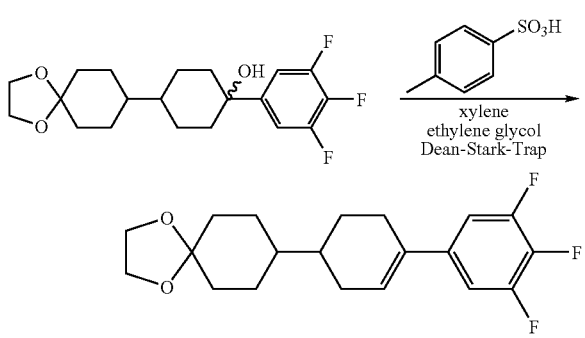

Step 3:

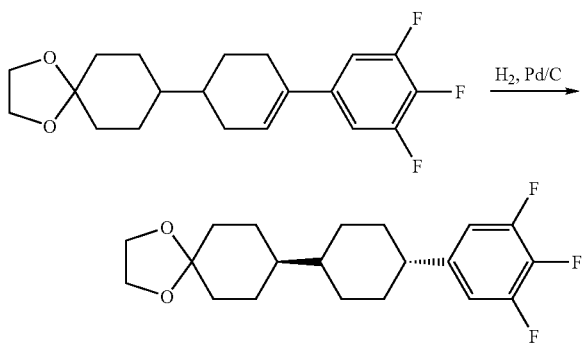

Step 4:

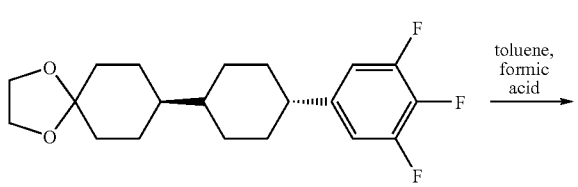

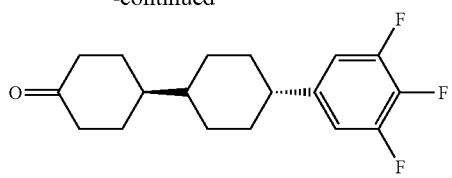

Steps 1-4 have been described in the literature.
Step 5:

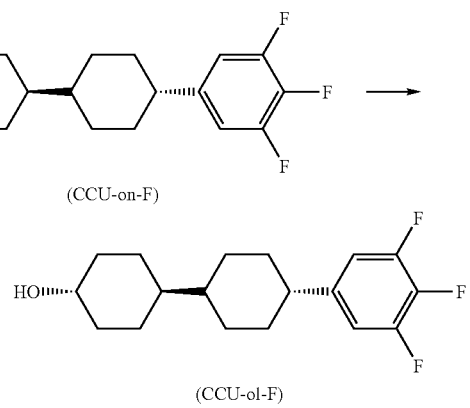

36.6 g CCU-on-F (98% trans), 44.1 g cer(III)chlorid heptahydrate (99.9%, Aldrich) are dissolved in 300 ml methanol and 150 ml THF. At 0-10° C. 2.081 g solid NaBH$_4$ (96%, Merck) is added portionwise. After the reaction is finished (5-20 min, DC-control) the mixture is quenched with 70 ml aq. ammonium chloride solution and 300 ml toluene are added. The mixture is filtered, the organic phase separated and the aqueous phase extracted with 100 ml toluene 3 times. The org. phases are dried, the solvent is evaporated and the residue recrystallized from heptane/toluene to give 32.6 g of a white solid (98.1% all-trans).
Step 6:

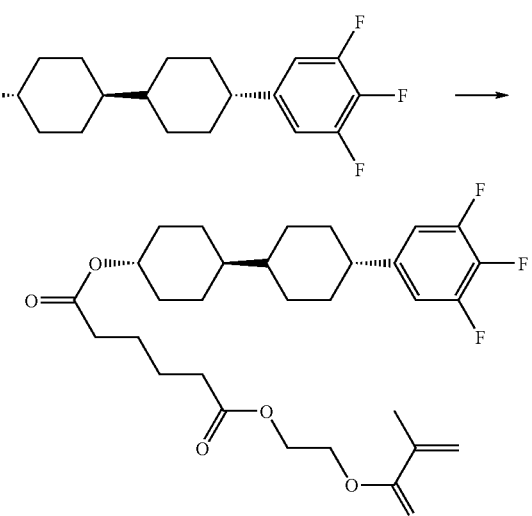

In a 500 ml four-neck flask 7.48 g DCC in 50 ml dichloromethane are added under a nitrogen atmosphere to a solution of 10.0 g CCU-ol-F, 117 mg DMAP and 7.36 g succinic acid mono-[2-(2-methyl-acryloyloxyyethyl]-ester in 250 ml dichloromethane and 80 ml toluene at 5° C. After stirring for 15 h at RT the reaction mixture is filtered, the solid washed with dichloromethane and the solvent evaporated off. After purification by column chromatography with heptane/ethyl acetate (3:1) 13.2 g (99.5%) of (1) are obtained as a white solid.

Compound (1) has the following properties:

G −37 K 70 I; $\Delta\epsilon$ +4.9; $\Delta n$ 0.0731

The following compounds are obtained analogously:

(2)
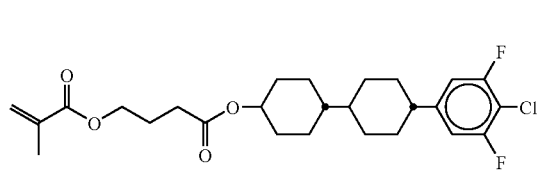

(3)
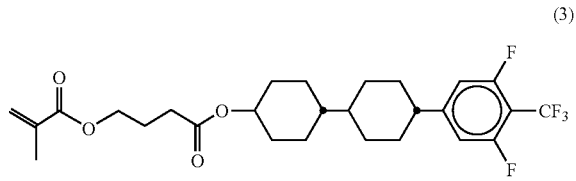

(4)
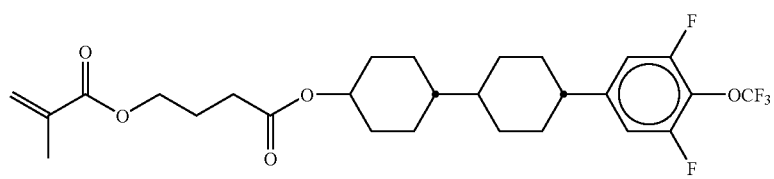

(5)
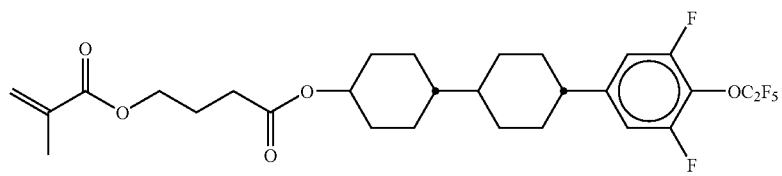

(6)
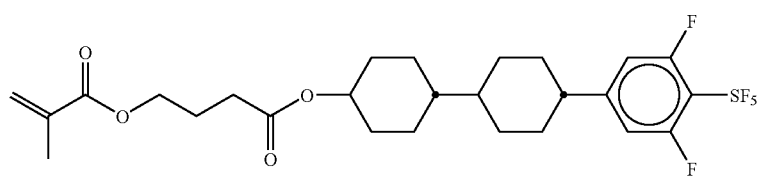

(7)
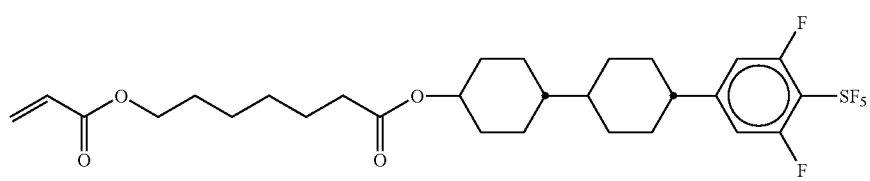

(8)
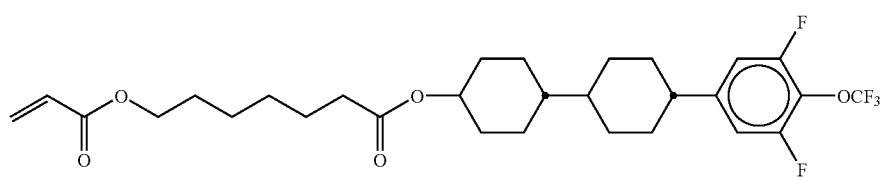

(9)
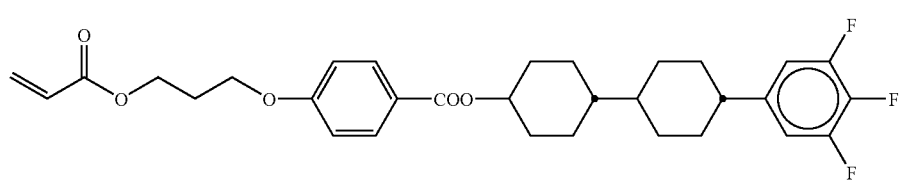

(10)
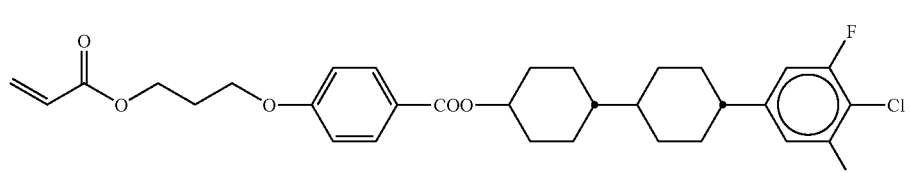

-continued
(11)
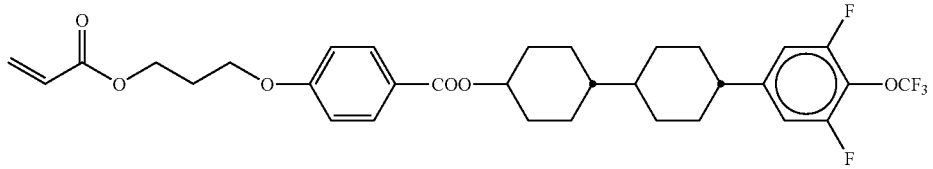
(12)
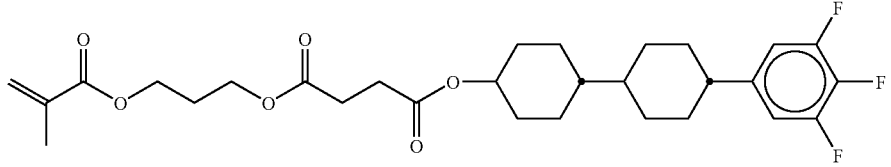
(13)
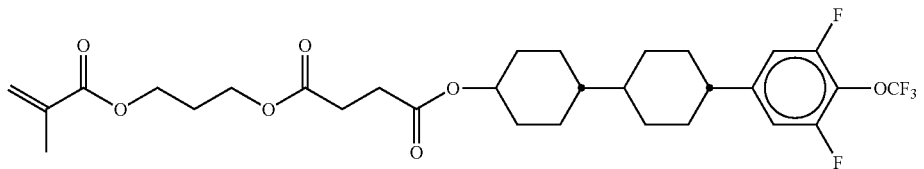
(14)
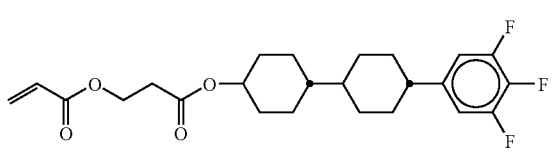
(15)
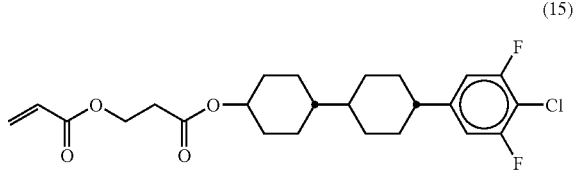
(16)
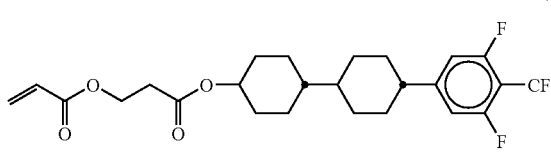
(17)
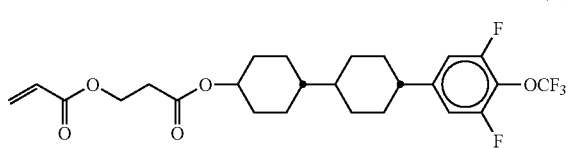
(18)
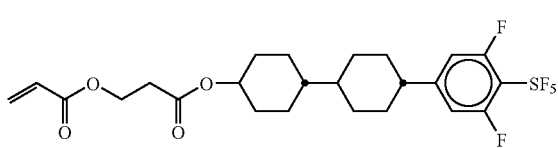
(19)
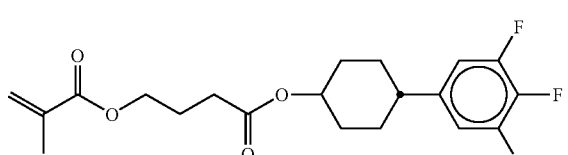
(20)
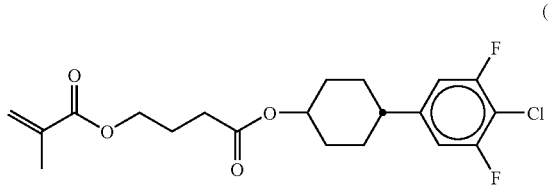
(21)
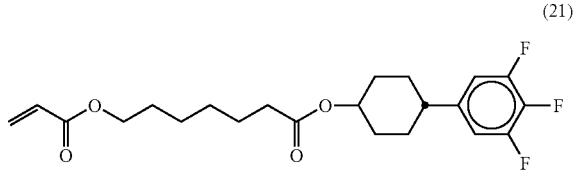
(22)
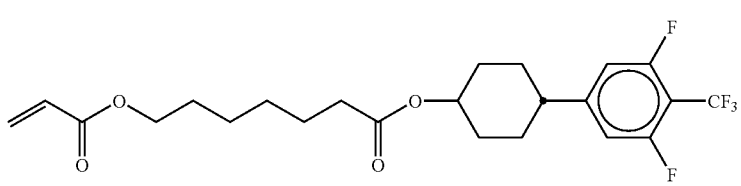
(23)
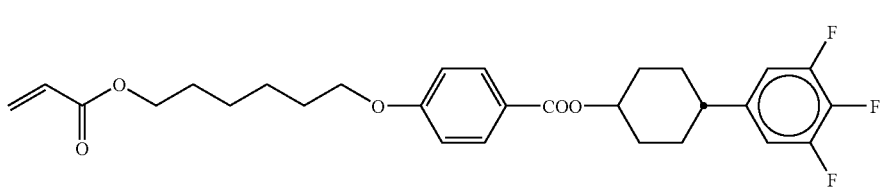

-continued (24)

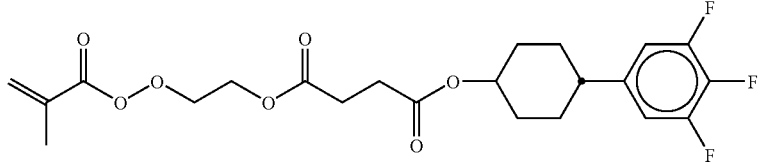

The entire disclosure[s] of all applications, patents and publications, cited herein and of corresponding European application No. 04018917.7, filed Aug. 10, 2004, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A liquid crystal material comprising at least one non-polymerizable liquid crystalline compound and at least one liquid crystalline compound of formula I

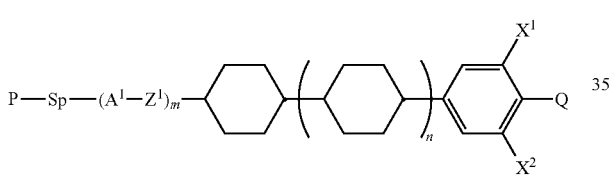

wherein
P is a polymerizable group of the formula $CH_2=CW^1-COO-$,

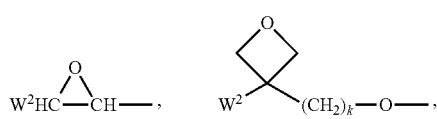

$(CH_2=CH)_2CH-OCO-$, $(CH_2=CH-CH_2)_2CH-OCO-$, $(CH_2=CH)_2CH-O-$, $(CH_2=CH-CH_2)_2N-$, $(CH_2=CH-CH_2)_2N-CO-$, $HO-CW^2W^3-$, $HS-CW^2W^3-$, $HW^2N-$, $HO-CW^2W^3-NH-$, $CH_2=CW^1-CO-NH-$, $CH_2=CH-(COO)_{k1}$-Phe-(O)—, Phe-CH=CH—, HOOC—, OCN— or $W^4W^5W^6Si-$, with $W^1$ being H, Cl, CN, phenyl or alkyl with 1 to 5 C-atoms, $W^2$ and $W^3$ each independently being H or alkyl with 1 to 5 C-atoms, $W^4$, $W^5$ and $W^6$ each independently being Cl, oxaalkyl or oxacarbonylalkyl with 1 to 5 C-atoms, Phe being 1,4-phenylene optionally substituted by one or more groups L, $k_1$ and $k_2$ are each independently 0 or 1, and F, Cl, Br, I, CN, $NO_2$ or alkyl, alkoxy, alkylcarbonyl, alkoxycarbonyl, alkylcarbonyloxy or alkoxycarbonyloxy with 1 to 20 C atoms, wherein one or more H atoms may be substituted by F or Cl, Sp is a spacer group, $A^1$ is each independently an aromatic or aliphatic 5- or 6-atom ring, or a group comprising two or three fused aromatic or aliphatic 5- or 6-membered rings, said rings optionally containing one or more N, O or S hetero atoms, and optionally being mono- or polysubstituted, $Z^1$ is each independently —O—, —S—, —CO—, —COO—, —OCO—, —S—CO—, —CO—S—, —O—CO—O—, —CO—$NR^0$—, —$NR^0$—CO—, —$OCH_2$—, —$CH_2O$—, —$SCH_2$—, —$CH_2S$—, —$CF_2O$—, —$OCF_2$—, —$CF_2S$—, —$SCF_2$—, —$CH_2CH_2$—, —$CF_2CH_2$—, —$CH_2CF_2$—, —$CF_2CF_2$—, —CH=$CR^0$—, —CH=CH—, —CH=CF—, —$CY^1$=$CY^1$—, —C≡C—, —CH=CH—COO—, —OCO—CH=CH— or a single bond, $R^0$ and $R^{00}$ are each independently H or alkyl with 1 to 12 C-atoms, $Y^1$ and $Y^2$ are each independently H, F, Cl or CN, Q is F, Cl, $SF_5$ or fluorinated alkyl, alkoxy, alkenyl or alkenyl-oxy with 1 to 6 C-atoms, $X^1$ and $X^2$ are each independently H or F, m is 0, 1 or 2, and n is 0 or 1.

2. A liquid crystalline phase, comprising at least two liquid crystalline compounds, wherein at least one compound is a compound of formula I

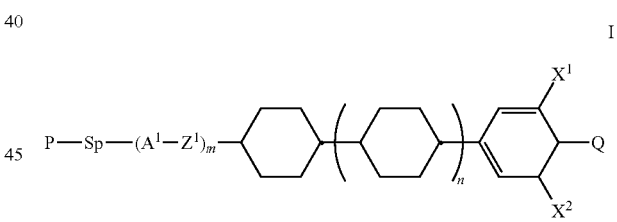

wherein
P is a polymerizable group of the formula $CH_2=CW^1-COO-$,

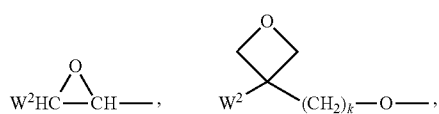

$(CH_2=CH)_2CH-OCO-$, $(CH_2=CH-CH_2)_2CH-OCO-$, $(CH_2=CH)_2CH-O-$, $(CH_2=CH-CH_2)_2N-$, $(CH_2=CH-CH_2)_2N-CO-$, $HO-CW^2W^3-$, $HS-CW^2W^3-$, $HW^2N-$, $HO-CW^2W^3-NH-$, $CH_2=CW^1-CO-NH-$, $CH_2=CH-(COO)_{k1}$-Phe-(O)—, Phe-CH=CH—, HOOC—, OCN— or $W^4W^5W^6Si-$, with $W^1$ being H, Cl, CN, phenyl or alkyl with 1 to 5 C-atoms, $W^2$ and $W^3$ each independently being H or alkyl with 1 to 5 C-atoms, $W^4$, $W^5$ and $W^6$ each independently being Cl, oxaalkyl or oxacarbonylalkyl with 1 to 5 C-atoms, Phe being 1,4-phenylene optionally substituted by one or more groups L, $k_1$ and $k_2$ are each independently 0 or 1, and F, Cl, Br, I, CN, $NO_2$ or alkyl, alkoxy, alkylcarbonyl, alkoxycarbonyl, alkylcarbonyloxy or alkoxycarbonyloxy with 1 to 20 C atoms, wherein one or more H atoms may be substituted by F or Cl, Sp is a spacer group, $A^1$ is each independently an aromatic or aliphatic 5- or 6-atom ring, or a group comprising two or three fused aromatic or aliphatic 5- or 6-membered rings, said rings optionally containing one or more N, O or S hetero atoms, and optionally being mono- or polysubstituted, $Z^1$ is each independently —O—, —S—, —CO—, —COO—, —OCO—, —S—CO—, —CO—S—, —O—CO—O—, —CO—$NR^0$—, —$NR^0$—CO—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —CF$_2$CH$_2$—, —CH$_2$CF$_2$—, —CF$_2$CF$_2$—, —CH=CR$^0$—, —CH=CH—, —CH=CF—, —CY$^1$=CY$^1$—, —C≡C—, —CH=CH—COO—, —OCO—CH=CH— or a single bond, $R^0$ and $R^{00}$ are each independently H or alkyl with 1 to 12 C-atoms, $Y^1$ and $Y^2$ are each independently H, F, Cl or CN, Q is F, Cl, $SF_5$ or fluorinated alkyl, alkoxy, alkenyl or alkenyl-oxy with 1 to 6 C-atoms, $X^1$ and $X^2$ are each independently H or F, m is 0, 1 or 2, and n is 0 or 1, with the proviso that if m is 0, n is 1 and Q is F, then $X^1$ and $X^2$ are F.

3. A compound of formula I

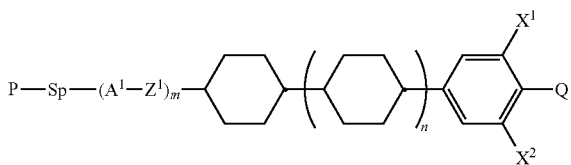

I wherein

P is a polymerizable group of the formula CH$_2$=CW$^1$—COO—,

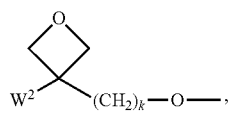

(CH$_2$=CH)$_2$CH—OCO—, (CH$_2$=CH—CH$_2$)$_2$CH—OCO—, (CH$_2$=CH)$_2$CH—O—, (CH$_2$=CH—CH$_2$)$_2$N—, (CH$_2$=CH—CH$_2$)$_2$N—CO—, HS—CW$^2$W$^3$—, HW$^2$N—, HO—CW$^2$W$^3$—NH—, CH$_2$=CW$^1$—CO—NH—, CH$_2$=CH—(COO)$_{k1}$-Phe-(O)—, Phe-CH=CH—, or OCN—, with $W^1$ being H, Cl, CN, phenyl or alkyl with 1 to 5 C-atoms, $W^2$ and $W^3$ each independently being H or alkyl with 1 to 5 C-atoms, Phe being 1,4-phenylene optionally substituted by one or more groups L, $k_1$ and $k_2$ are each independently 0 or 1, and F, Cl, Br, I, CN, $NO_2$ or alkyl, alkoxy, alkylcarbonyl, alkoxycarbonyl, alkylcarbonyloxy or alkoxycarbonyloxy with 1 to 20 C atoms, wherein one or more H atoms may be substituted by F or Cl, Sp is a spacer group, $A^1$ is each independently an aromatic or aliphatic 5- or 6-atom ring, or a group comprising two or three fused aromatic or aliphatic 5- or 6-membered rings, said rings optionally containing one or more N, O or S hetero atoms, and optionally being mono- or polysubstituted, $Z^1$ is each independently —O—, —S—, —CO—, —COO—, —OCO—, —S—CO—, —CO—S—, —O—CO—O—, —CO—$NR^0$—, —$NR^0$—CO—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —CF$_2$CH$_2$—, —CH$_2$CF$_2$—, —CF$_2$CF$_2$—, —CH=CR$^0$—, —CH=CH—, —CH=CF—, —CY$^1$=CY$^1$—, —C≡C—, —CH=CH—COO—, —OCO—CH=CH— or a single bond, $R^0$ and $R^{00}$ are each independently H or alkyl with 1 to 12 C-atoms, $Y^1$ and $Y^2$ are each independently H, F, Cl or CN, Q is F, Cl, $SF_5$ or fluorinated alkyl, alkoxy, alkenyl or alkenyl-oxy with 1 to 6 C-atoms, $X^1$ and $X^2$ are each independently H or F, m is 0, 1 or 2, and n is 0 or 1, with the proviso that if the compounds have the structure

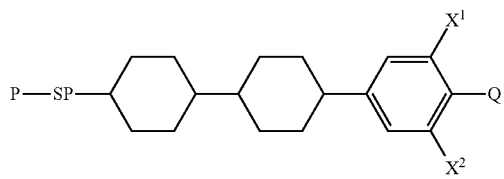

and Q is F, then $X^1$ and $X^2$ are F.

4. A compound according to claim 3, wherein m is 0.

5. A compound according to claim 3, wherein Q is F, Cl, $SF_5$, $CF_3$, $OCF_3$, $OCHF_2$ or $OC_2F_5$.

6. A compound according to claim 3, wherein $X^1$ and/or $X^2$ is F.

7. A compound according to claim 3, wherein Sp is alkylene with 1 to 20 C atoms which is optionally mono- or polysubstituted by F and wherein one or more non-adjacent CH$_2$ groups are replaced, in each case independently from one another, by —CO—, —O—CO—, —CO—O—, —O—Co—O—, —NR$^0$—CO—O—, —O—CO—NR$^0$—, —NR$^0$—CO—NR$^0$— in such a manner that O-atoms are not directly linked to one another.

8. A compound of the formulae

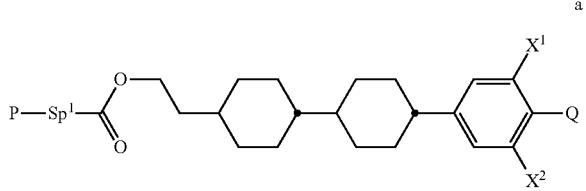

a

-continued

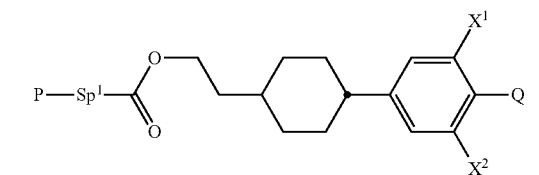
b

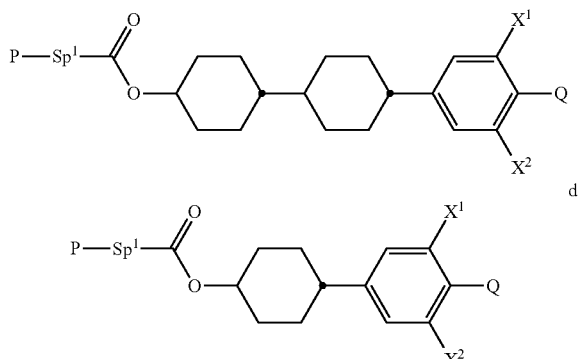
c d

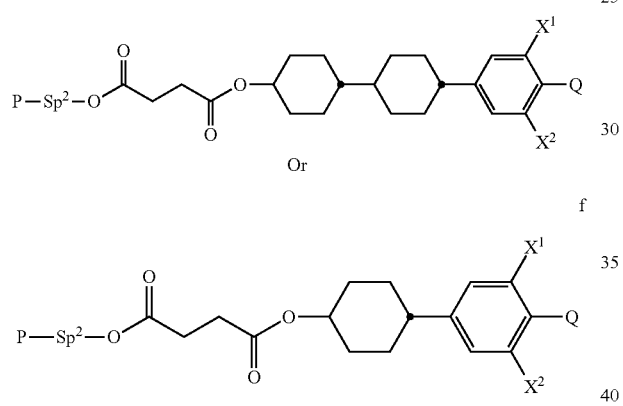
e

Or f wherein
P is a polymerizable group of the formula $CH_2=CW^1—COO—$,

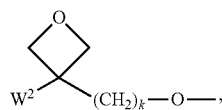

$CH_2=CW^2—(O)—$, $CH_3—CH=CH—O—$, $(CH_2=CH)_2CH—OCO—$, $(CH_2=CH—CH_2)_2CH—OCO—$, $(CH_2=CH)_2CH—O—$, $(CH_2=CH—CH_2)_2N—$, $(CH_2=CH—CH_2)_2N—CO—$, $—HS—CW^2W^3—$, $HW^2N—$, $HO—CW^2W^3—NH—$, $CH_2=CW^1—CO—NH—$, $CH_2=CH—(COO)_{k1}$-Phe-(O)—, Phe-CH=CH—, HOOC—, OCN— or $W^4W^5W^6Si—$, with $W^1$ being H, Cl, CN, phenyl or alkyl with 1 to 5 C-atoms, $W^2$ and $W^3$ each independently being H or alkyl with 1 to 5 C-atoms, $W^4$, $W^5$ and $W^6$ each independently being Cl, oxaalkyl or oxacarbonylalkyl with 1 to 5 C-atoms, Phe being 1,4-phenylene optionally substituted by one or more groups L, $k_1$ and $k_2$ are each independently 0 or 1, and F, Cl, Br, I, CN, $NO_2$ or alkyl, alkoxy, alkylcarbonyl, alkoxycarbonyl, alkylcarbonyloxy or alkoxycarbonyloxy with 1 to 20 C atoms, wherein one or more H atoms may be substituted by F or Cl, $X^1$ and $X^2$ are each independently H or F, Q is F, Cl, $SF_5$ or fluorinated alkyl, alkoxy, alkenyl or alkenyl-oxy with 1 to 6 C-atoms, $Sp^1$ is alkylene with 1 to 20 C atoms which is optionally mono- or polysubstituted by F, Cl, Br, I or CN, and wherein one or more non-adjacent $CH_2$ groups are optionally replaced, in each case independently from one another, by —O—, —S—, —NH—, —$NR^0$—, —$SiR^0R^{00}$—, —CO—, —COO—, —OCO—, —OCO—O—, —S—CO—, —CO—S—, —$NR^0$—CO—O—, —O—CO—$NR^0$—, —$NR^0$—CO—$NR^0$—, —CH=CH— or —C≡C— in such a manner that O and/or S atoms are not linked directly to one another, wherein $R^0$ is H or alkyl with 1 to 12 C-atoms, and $Sp^2$ is alkylene with 1 to 12 C-atoms.

9. A compound according to claim 3, of the formulae

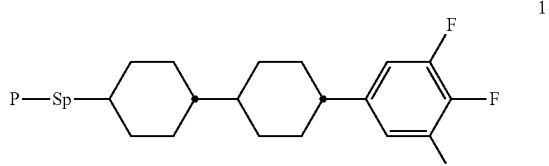
1

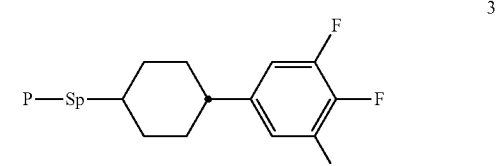
3

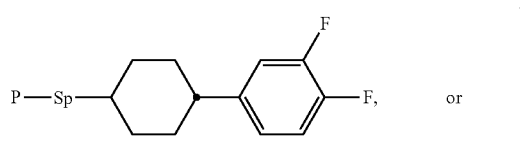
4 or

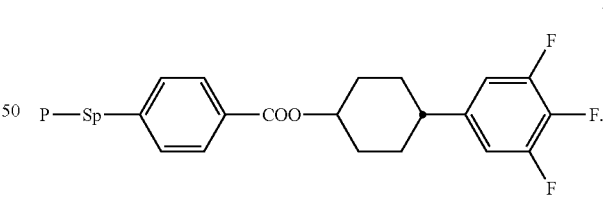
5

10. A compound according to claim 3, wherein $A^1$ is 1,4-cyclohexylene, 1,4-phenylene, tetrahydropyrane-2,5-diyl, dioxane-2,5-diyl, furane-2,5-diyl, thiophene-2,5-diyl, pyrrol-2,5-diyl, pyridine-2,5-diyl, pyrimidine-2,5-diyl, naphthalene-2,6-diyl, 1,2,3,4-tetrahydronaphthalene-2,6-diyl, decaline-2,6-diyl, indane-2,5-diyl, each optionally being mono- or polysubstituted by L, with L being F, Cl, Br, I, CN, $NO_2$ or alkyl, alkoxy, alkylcarbonyl, alkoxycarbonyl, alkylcarbonyloxy or alkoxycarbonyloxy with 1 to 20 C atoms, wherein one or more H atoms may be replaced by F or Cl.

11. A polymerizable liquid crystal material comprising at least one compound according to claim 3.

12. An anisotropic polymer or polymer film obtainable from a polymerizable liquid crystal material of formula 1

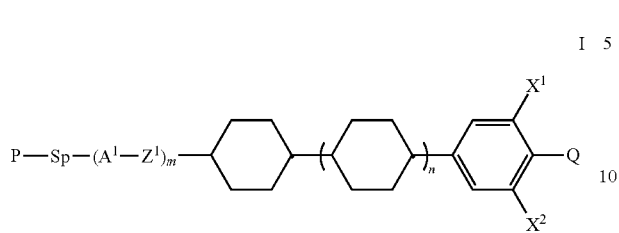

wherein

P is a polymerizable group of the formula $CH_2=CW^1-COO-$,

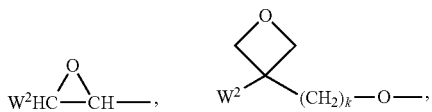

$(CH_2=CH)_2CH-OCO-$, $(CH_2=CH-CH_2)_2CH-OCO-$, $(CH_2=CH)_2CH-O-$, $(CH_2=CH-CH_2)_2N-$, $(CH_2=CH-CH_2)_2N-CO-$, $HS-CW^2W^3-$, $HW^2N-$, $HO-CW^2W^3-NH-$, $CH_2=CW^1-CO-NH-$, $CH_2=CH-(COO)_{k1}$-Phe-(O)—, Phe-CH=CH—, HOOC—, OCN— or $W^4W^5W^6Si-$, with $W^1$ being H, Cl, CN, phenyl or alkyl with 1 to 5 C-atoms, $W^2$ and $W^3$ each independently being H or alkyl with 1 to 5 C-atoms, $W^4$, $W^5$ and $W^6$ each independently being Cl, oxaalkyl or oxacarbonylalkyl with 1 to 5 C-atoms, Phe being 1,4-phenylene optionally substituted by one or more groups L, $k_1$ and $k_2$ are each independently 0 or 1, and F, Cl, Br, I, CN, $NO_2$ or alkyl, alkoxy, alkylcarbonyl, alkoxycarbonyl, alkylcarbonyloxy or alkoxycarbonyloxy with 1 to 20 C atoms, wherein one or more H atoms may be substituted by F or Cl, Sp is a spacer group, $A^1$ is each independently an aromatic or aliphatic 5- or 6-atom ring, or a group comprising two or three fused aromatic or aliphatic 5- or 6-membered rings, said rings optionally containing one or more N, O or S hetero atoms, and optionally being mono- or polysubstituted, $Z^1$ is each independently —O—, —S—, —CO—, —COO—, —OCO—, —S—CO—, —CO—S—, —O—CO—O—, —CO—$NR^0$—, —$NR^0$—CO—, —$OCH_2$—, —$CH_2O$—, —$SCH_2$—, —$CH_2S$—, —$CF_2O$—, —$OCF_2$—, —$CF_2S$—, —$SCF_2$—, —$CH_2CH_2$—, —$CF_2CH_2$—, —$CH_2CF_2$—, —$CF_2CF_2$—, —CH=$CR^0$—, —CH=CH—, —CH=CF—, —$CY^1$=$CY^1$—, —C≡C—, —CH=CH—COO—, —OCO—CH=CH— or a single bond, $R^0$ and $R^{00}$ are each independently H or alkyl with 1 to 12 C-atoms, $Y^1$ and $Y^2$ are each independently H, F, Cl or CN, Q is F, Cl, $SF_5$ or fluorinated alkyl, alkoxy, alkenyl or alkenyl-oxy with 1 to 6 C-atoms, $X^1$ and $X^2$ are each independently H or F, m is 0, 1 or 2, and n is 0 or 1, with the proviso that if the compounds have the structure

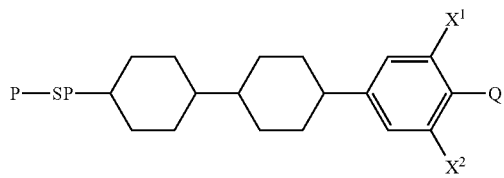

and Q is F, then $X^1$ and $X^2$ are F.

13. An optical film, polarizer, compensator, beam splitter, reflective film, alignment layer, color filter, holographic element, hot stamping foil, coloured image, decorative or security marking, liquid crystal pigment, adhesive, synthetic resin with anisotropic mechanical properties, cosmetic, diagnostic, nonlinear optic, optical information storage medium, chiral dopant, electronic device, field effect transistor, integrated circuit, thin film transistor in flat panel display application, radio frequency identification tag, semiconducting component for organic light emitting diode, electroluminescent display or backlight, photovoltaic or sensor device, electrode material in a battery, photoconductor, or electrophotographic medium, containing a liquid crystalline compound according to claim 3.

14. A liquid crystalline phase, comprising at least two liquid crystalline compounds, wherein at least one compound is a compound of formula I

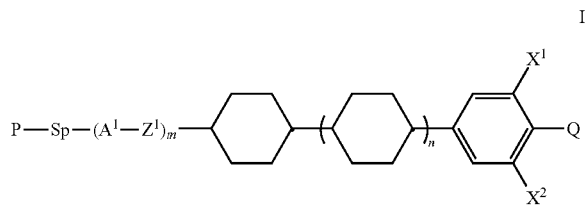

wherein

P is a polymerizable group of the formula $CH_2=CW^1-COO-$,

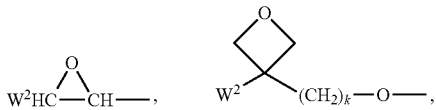

$(CH_2=CH)_2CH-OCO-$, $(CH_2=CH-CH_2)_2CH-OCO-$, $(CH_2=CH)_2CH-O-$, $(CH_2=CH-CH_2)_2N-$, $(CH_2=CH-CH_2)_2N-CO-$, $HO-CW^2W^3-$, $HS-CW^2W^3-$, $HW^2N-$, $HO-CW^2W^3-NH-$, $CH_2=CW^1-CO-NH-$, $CH_2=CH-(COO)_{k1}$-Phe-(O)—, Phe-CH=CH—, HOOC—, OCN— or $W^4W^5W^6Si-$, with $W^1$ being H, Cl, CN, phenyl or alkyl with 1 to 5 C-atoms, $W^2$ and $W^3$ each independently being H or alkyl with 1 to 5 C-atoms, $W^4$, $W^5$ and $W^6$ each independently being Cl, oxaalkyl or oxacarbonylalkyl with 1 to 5 C-atoms, Phe being 1,4-phenylene optionally substituted by one or more groups L, $k_1$ and $k_2$ are each independently 0 or 1, and F, Cl, Br, I, CN, $NO_2$ or alkyl, alkoxy, alkylcarbonyl, alkoxycarbonyl, alkylcarbonyloxy or alkoxycarbonyloxy with 1 to 20 C atoms, wherein one or more H atoms may be substituted by F or Cl, Sp is a spacer group, A$^1$ is each independently an aromatic or aliphatic 5- or 6-atom ring, or a group comprising two or three fused aromatic or aliphatic 5- or 6-membered rings, said rings optionally containing one or more N, O or S hetero atoms, and optionally being mono- or polysubstituted, Z$^1$ is each independently —O—, —S—, —CO—, —COO—, —OCO—, —S—CO—, —CO—S—, —O—CO—O—, —CO—NR$^0$—, —NR$^0$—CO—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —CF$_2$CH$_2$—, —CH$_2$CF$_2$—, —CF$_2$CF$_2$—, —CH=CR$^0$—, —CH=CH—, —CH=CF—, —CY$^1$=CY$^1$—, —C≡C—, —CH=CH—COO—, —OCO—CH=CH— or a single bond, R$^0$ and R$^{00}$ are each independently H or alkyl with 1 to 12 C-atoms, Y$^1$ and Y$^2$ are each independently H, F, Cl or CN, Q is F, X$^1$ and X$^2$ are each F, m is 0, and n is 0 or 1.

15. A compound of formula I wherein

P is a polymerizable group of the formula CH$_2$=CW$^1$—COO—, (CH$_2$=CH)$_2$CH—OCO—, (CH$_2$=CH—CH$_2$)$_2$CH—OCO—, (CH$_2$=CH)$_2$CH—O—, (CH$_2$=CH—CH$_2$)$_2$N—, (CH$_2$=CH—CH$_2$)$_2$N—CO—, HS—CW$^2$W$^3$—, HW$^2$N—, HO—CW$^2$W$^3$—NH—, CH$_2$=CW$^1$—CO—NH—, CH$_2$=CH—(COO)$_{k1}$-Phe-(O)—, Phe-CH=CH—, HOOC— or OCN— with W$^1$ being H, Cl, CN, phenyl or alkyl with 1 to 5 C-atoms, W$^2$ and W$^3$ each independently being H or alkyl with 1 to 5 C-atoms, Phe being 1,4-phenylene optionally substituted by one or more groups L, k$_1$ and k$_2$ are each independently 0 or 1, and F, Cl, Br, I, CN, NO$_2$ or alkyl, alkoxy, alkylcarbonyl, alkoxycarbonyl, alkylcarbonyloxy or alkoxycarbonyloxy with 1 to 20 C atoms, wherein one or more H atoms may be substituted by F or Cl, Sp is a spacer group, A$^1$ is each independently an aromatic or aliphatic 5- or 6-atom ring, or a group comprising two or three fused aromatic or aliphatic 5- or 6-membered rings, said rings optionally containing one or more N, O or S hetero atoms, and optionally being mono- or polysubstituted, Z$^1$ is each independently —O—, —S—, —CO—, —COO—, —OCO—, —S—CO—, —CO—S—, —O—CO—O—, —CO—NR$^0$—, —NR$^0$—CO—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —CF$_2$CH$_2$—, —CH$_2$CF$_2$—, —CF$_2$CF$_2$—, —CH=CR$^0$—, —CH=CH—, —CH=CF—, —CY$^1$=CY$^1$—, —C≡C—, —CH=CH—COO—, —OCO—CH=CH— or a single bond, R$^0$ and R$^{00}$ are each independently H or alkyl with 1 to 12 C-atoms, Y$^1$ and Y$^2$ are each independently H, F, Cl or CN, Q is F, X$^1$ and X$^2$ are each F, m is 0, and n is 0 or 1.

16. A polymerizable liquid crystal material comprising at least one compound according to claim 15.

17. An anisotropic polymer or polymer film obtainable from a polymerizable liquid crystal material comprising a compound of formula I wherein P is a polymerizable group of the formula CH$_2$=CW$^1$—COO—, (CH$_2$=CH)$_2$CH—OCO—, (CH$_2$=CH—CH$_2$)$_2$CH—OCO—, (CH$_2$=CH)$_2$CH—O—, (CH$_2$=CH—CH$_2$)$_2$N—, (CH$_2$=CH—CH$_2$)$_2$N—Co—, HS—CW$^2$W$^3$—, HW$^2$N—, HO—CW$^2$W$^3$—NH—, CH$_2$=CW$^1$—CO—NH—, CH$_2$=CH—(COO)$_{k1}$-Phe-(O)—, Phe-CH=CH—, HOOC—, OCN— or W$^4$W$^5$W$^6$Si—, with W$^1$ being H, Cl, CN, phenyl or alkyl with 1 to 5 C-atoms, W$^2$ and W$^3$ each independently being H or alkyl with 1 to 5 C-atoms, W$^4$, W$^5$ and W$^6$ each independently being Cl, oxaalkyl or oxacarbonylalkyl with 1 to 5 C-atoms, Phe being 1,4-phenylene optionally substituted by one or more groups L, k$_1$ and k$_2$ are each independently 0 or 1, and F, Cl, Br, I, CN, NO$_2$ or alkyl, alkoxy, alkylcarbonyl, alkoxycarbonyl, alkylcarbonyloxy or alkoxycarbonyloxy with 1 to 20 C atoms, wherein one or more H atoms may be substituted by F or Cl, Sp is a spacer group, A$^1$ is each independently an aromatic or aliphatic 5- or 6-atom ring, or a group comprising two or three fused aromatic or aliphatic 5- or 6-membered rings, said rings optionally containing one or more N, O or S hetero atoms, and optionally being mono- or polysubstituted, Z$^1$ is each independently —O—, —S—, —CO—, —COO—, —OCO—, —S—CO—, —CO—S—, —O—CO—O—, —CO—NR$^0$—, —NR$^0$—CO—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —CF$_2$CH$_2$—, —CH$_2$CF$_2$—, —CF$_2$CF$_2$—, —CH=CR$^0$—, —CH=CH—, —CH=CF—, —CY$^1$=CY$^1$—, —C≡C—, —CH=CH—COO—, —OCO—CH=CH— or a single bond, R$^0$ and R$^{00}$ are each independently H or alkyl with 1 to 12 C-atoms, Y$^1$ and Y$^2$ are each independently H, F, Cl or CN, Q is F, X$^1$ and X$^2$ are each F, m is 0, and n is 0 or 1.

18. A liquid crystal material according to claim 1, wherein Sp is Sp'-X, wherein Sp' is alkylene with 1 to 20 C atoms, which is optionally mono- or polysubstituted by F, Cl, Br, I or CN, and wherein one or more non-adjacent CH$_2$ groups are optionally replaced, in each case independently from one another, by —O—, —S—, —NH—, —NR$^0$—, —SiR$^0$R$^{00}$—, CO—, —COO—, OCO—, —OCO—O—, —S—CO—, —CO—S—, —NR$^0$—CO—O—, —O—CO—NR$^0$—, NR$^0$—CO—NR$^0$—, —CH=CH— or —C≡C— in such a manner that O and/or S atoms are not linked directly to one another, X is —O—, —S—, —CO—, —COO—, —OCO—, —O—COO—, —CO—NR$^0$—, NR$^0$—CO—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH2, —CH$_2$CF$_2$—, —CF$_2$CF$_2$—, —CH=N—, —N=CH—, —N=N—, —CH=CR$^0$—, —CY$^1$=CY$^2$—, —C≡C—, —CH=CH—COO—, —OCO—CH=CH— or a single bond, R$^0$ and R$^{00}$ are independently of each other H or alkyl with 1 to 12 C-atoms, and Y$^1$ and Y$^2$ are independently of each other H, F, Cl or CN.

19. A liquid crystal phase according to claim 2, wherein Sp is Sp'-X,

Sp' is alkylene with 1 to 20 C atoms, which is optionally mono- or polysubstituted by F, Cl, Br, I or CN, and wherein one or more non-adjacent CH$_2$ groups are optionally replaced, in each case independently from one another, by —O—, —S—, —NH—, —NR$^0$—, SiR$^0$R$^{00}$—, —CO—, —COO—, OCO—, —OCO—O—, —S—CO—, —CO—S—, —NR$^0$—CO—O—, —O—CO—NR$^0$—, NR$^0$—CO—NR0, —CH=CH— or —C≡C— in such a manner that O and/or S atoms are not linked directly to one another, X is —O—, —S—, —CO—, —COO—, —OCO—, —O—COO—, —CO—NR$^0$—, NR$^0$—CO—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR$^0$—, —CY$^1$=CY$^2$—, —C≡C—, —CH=CH—COO—, —OCO—CH=CH— or a single bond, R$^0$ and R$^{00}$ are independently of each other H or alkyl with 1 to 12 C-atoms, and Y$^1$ and Y$^2$ are independently of each other H, F, Cl or CN.

20. A compound according to claim 3, wherein Sp is Sp'-X, Sp' is alkylene with 1 to 20 C atoms, which is optionally mono- or polysubstituted by F, Cl, Br, I or CN, and wherein one or more non-adjacent CH$_2$ groups are optionally replaced, in each case independently from one another, by —O—, —S—, —NH—, —NR$^0$—, —SiR$^0$R$^{00}$—, —CO—, —COO—, OCO—, —OCO—O—, —S—CO—, —CO—S—, —NR$^0$—CO—O—, —O—CO—NR$^0$—, NR$^0$—CO—NR$^0$—, —CH=CH— or —C≡C— in such a manner that O and/or S atoms are not linked directly to one another, X is —O—, —S—, —CO—, —COO—, —OCO—, —O—COO—, —CO—NR$^0$—, NR$^0$—CO—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR$^0$—, —CY$^1$=CY$^2$—, —C≡C—, —CH=CH—COO—, —OCO—CH=CH— or a single bond, R$^0$ and R$^{00}$ are independently of each other H or alkyl with 1 to 12 C-atoms, and Y$^1$ and Y$^2$ are independently of each other H, F, Cl or CN.

21. A liquid crystalline material according to claim 1, wherein

P is a polymerizable group of the formula CH$_2$=CW$^1$—COO—,

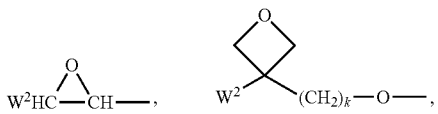

(CH$_2$=CH)$_2$CH—OCO—, (CH$_2$=CH—CH$_2$)$_2$CH—OCO—, (CH$_2$=CH)$_2$CH—O—, (CH$_2$=CH—CH$_2$)$_2$N—, (CH$_2$=CH—CH$_2$)$_2$N—CO—, HS—CW$^2$W$^3$—, HW$^2$N—, HO—CW$^2$W$^3$—NH—, CH$_2$=CW$^1$—CO—NH—, CH$_2$=CH—(COO)$_{k1}$-Phe-(O)—, Phe-CH=CH—, HOOC—, OCN— or W$^4$W$^5$W$^6$Si—, with W$^1$ being H, Cl, CN, phenyl or alkyl with 1 to 5 C-atoms, W$^2$ and W$^3$ each independently being H or alkyl with 1 to 5 C-atoms, W$^4$, W$^5$ and W$^6$ each independently being Cl, oxaalkyl or oxacarbonylalkyl with 1 to 5 C-atoms, Phe being 1,4-phenylene optionally substituted by one or more groups L, k$_1$ and k$_2$ are each independently 0 or 1, and F, Cl, Br, I, CN, NO$_2$ or alkyl, alkoxy, alkylcarbonyl, alkoxycarbonyl, alkylcarbonyloxy or alkoxycarbonyloxy with 1 to 20 C atoms, wherein one or more H atoms may be substituted by F or Cl.

22. A liquid crystalline phase according to claim 2, wherein

P is a polymerizable group of the formula CH$_2$=CW$^1$—COO—,

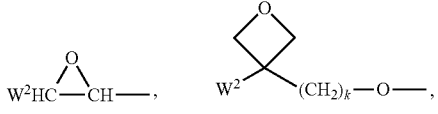

(CH$_2$=CH)$_2$CH—OCO—, (CH$_2$=CH—CH$_2$)$_2$CH—OCO—, (CH$_2$=CH)$_2$CH—O—, (CH$_2$=CH—CH$_2$)$_2$N—, (CH$_2$=CH—CH$_2$)$_2$N—CO—, HS—CW$^2$W$^3$—, HW$^2$N—, HO—CW$^2$W$^3$—NH—, CH$_2$=CW$^1$—CO—NH—, CH$_2$=CH—(COO)$_{k1}$-Phe-(O)—, Phe-CH=CH—, HOOC—, OCN— or W$^4$W$^5$W$^6$Si—, with W$^1$ being H, Cl, CN, phenyl or alkyl with 1 to 5 C-atoms, W$^2$ and W$^3$ each independently being H or alkyl with 1 to 5 C-atoms, W$^4$, W$^5$ and W$^6$ each independently being Cl, oxaalkyl or oxacarbonylalkyl with 1 to 5 C-atoms, Phe being 1,4-phenylene optionally substituted by one or more groups L, k$_1$ and k$_2$ are each independently 0 or 1, and F, Cl, Br, I, CN, NO$_2$ or alkyl, alkoxy, alkylcarbonyl, alkoxycarbonyl, alkylcarbonyloxy or alkoxycarbonyloxy with 1 to 20 C atoms, wherein one or more H atoms may be substituted by F or Cl.

23. A liquid crystalline phase according to claim 14, wherein

P is a polymerizable group of the formula $CH_2$=$CW^1$—COO—,

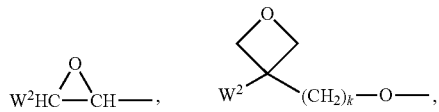

$(CH_2$=$CH)_2CH$—OCO—, $(CH_2$=$CH$—$CH_2)_2CH$—OCO—, $(CH_2$=$CH)_2CH$—O—, $(CH_2$=$CH$—$CH_2)_2N$—, $(CH_2$=$CH$—$CH_2)_2N$—CO—, HS—$CW^2W^3$—, $HW^2N$—, HO—$CW^2W^3$—NH—, $CH_2$=$CW^1$—CO—NH—, $CH_2$=$CH$—$(COO)_{k1}$-Phe-(O)—, Phe-CH=CH—, HOOC—, OCN— or $W^4W^5W^6Si$—, with $W^1$ being H, Cl, CN, phenyl or alkyl with 1 to 5 C-atoms, $W^2$ and $W^3$ each independently being H or alkyl with 1 to 5 C-atoms, $W^4$, $W^5$ and $W^6$ each independently being Cl, oxaalkyl or oxacarbonylalkyl with 1 to 5 C-atoms, Phe being 1,4-phenylene optionally substituted by one or more groups L, $k_1$ and $k_2$ are each independently 0 or 1, and F, Cl, Br, I, CN, $NO_2$ or alkyl, alkoxy, alkylcarbonyl, alkoxycarbonyl, alkylcarbonyloxy or alkoxycarbonyloxy with 1 to 20 C atoms, wherein one or more H atoms may be substituted by F or Cl.

* * * * *

UNITED STATES PATENT AND TRADEMARK OFFICE
CERTIFICATE OF CORRECTION

PATENT NO.       : 8,043,670 B2                                   Page 1 of 1
APPLICATION NO.  : 11/200260
DATED            : October 25, 2011
INVENTOR(S)      : Klein et al.

It is certified that error appears in the above-identified patent and that said Letters Patent is hereby corrected as shown below:

Column 32, line 53 reads "-O-Co-O-, -NR$^0$-CO-O-, -O-CO-NR$^0$-," should read
-- -O-CO-O-, -NR$^0$-CO-O-, -O-CO-NR$^0$- --

Column 38, line 45 reads "(CH$_2$=CH-CH$_2$)$_2$N-Co-, HS-CW$^2$W$^3$-, HW$^2$N-," should read
-- (CH$_2$=CH-CH$_2$)$_2$N-CO-, HS-CW$^2$W$^3$-, HW$^2$N-, --

Signed and Sealed this
Sixth Day of March, 2012

David J. Kappos
*Director of the United States Patent and Trademark Office*